US012776104B1

(12) United States Patent
Mammou

(10) Patent No.: US 12,776,104 B1
(45) Date of Patent: Oct. 27, 2026

(54) ATTRIBUTE TRANSFER FUNCTION FOR RE-MESHED CONTENT WITH SMALL OR ISOLATED MESH TRIANGLES AND ASSOCIATED BIT STREAM STRUCTURE AND SYNTAX

(71) Applicant: Apple Inc., Cupertino, CA (US)

(72) Inventor: Khaled Mammou, Danville, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 18/956,380

(22) Filed: Nov. 22, 2024

Related U.S. Application Data

(60) Provisional application No. 63/602,228, filed on Nov. 22, 2023.

(51) Int. Cl.
*G06T 17/20* (2006.01)
*G06T 5/70* (2024.01)

(52) U.S. Cl.
CPC .............. *G06T 17/205* (2013.01); *G06T 5/70* (2024.01)

(58) Field of Classification Search
CPC ................................ G06T 17/205; G06T 5/70
See application file for complete search history.

(56) References Cited

U.S. PATENT DOCUMENTS

| | | | |
|---|---|---|---|
| 10,984,541 B2 | 4/2021 | Lim et al. | |
| 11,457,231 B2 | 9/2022 | Wang et al. | |
| 11,615,578 B1 | 3/2023 | Klein et al. | |
| 12,230,002 B2 | 2/2025 | Salahieh et al. | |
| 2022/0335666 A1* | 10/2022 | Cai | G06T 12/20 |
| 2023/0014820 A1 | 1/2023 | Zhang et al. | |
| 2023/0360275 A1* | 11/2023 | Zhang | G06T 9/001 |
| 2024/0153150 A1 | 5/2024 | Kim et al. | |
| 2024/0193747 A1* | 6/2024 | Bradley | G06T 7/0002 |

FOREIGN PATENT DOCUMENTS

| | | |
|---|---|---|
| CN | 107909612 B | 1/2021 |
| CN | 114677484 B | 11/2024 |
| CN | 119094795 A | 12/2024 |
| CN | 112634431 B | 5/2025 |

* cited by examiner

*Primary Examiner* — Daniel F Hajnik
*Assistant Examiner* — Joshua Jungwook Suo
(74) *Attorney, Agent, or Firm* — Alexander A. Knapp; Kowert, Hood, Munyon, Rankin & Goetzel, P.C.

(57) ABSTRACT

Systems and methods for performing an attribute transfer operation between an original version of three-dimensional visual volumetric content (e.g., an original mesh) and a second version of the three-dimensional visual volumetric content (e.g. a modified version of the original mesh) are disclosed. The original and modified versions of the three-dimensional visual volumetric content are sampled in 3D space to generate point clouds of samples for both the original and modified versions. Points with known attribute values included in the point cloud corresponding to the original version are associated with points in the second point cloud corresponding to the modified version. The attribute values of the points of the first point cloud and relative positions relative to the points of the second point cloud are used to calculate attribute values for an attribute map for the modified version of the three-dimensional visual volumetric content.

20 Claims, 26 Drawing Sheets

| | |
|---|---|
| # link to material library<br>mtllib  person_00000001.mtl<br># Positions (e.g. Geometry Information)<br>v 64.062500 1237.739990 51.757801<br>v 59.570301 1236.819946 54.899700<br>...<br>v -104.573997 434.458008 175.684006<br>v 98.071899 744.414978 178.248001<br>v 96.240196 781.739990 178.076004<br>v 95.393799 791.934998 178.188004<br># Texture coordinates<br>vt 0.897381 0.740830<br>vt 0.899059 0.741542<br>...<br>vt 0.548180 0.679136<br># link to material<br>usemtl material0000<br># connectivity for geometry and texture<br>f 1/1 2/2 3/3<br>f 4/7 1/1 3/9<br>...<br>f 4318/4318 3539/3539 16453/16453 | newmtl material0000<br>Ka 1.0 1.0 1.0<br>Kd 1.0 1.0 1.0<br>Ks 1.0 1.0 1.0<br>map_Kd<br># link to a 2D image<br>person_00000001.png |
| person_00000001.obj | person_00000001.mtl |
| Example of a textured mesh stored in OBJ format. | |
| | |

FIG. 2

| Configuration | First TFan Vertex | Last TFan Vertex | Other TFan vertices are new |
|---|---|---|---|
| 0 | Right | Left | Yes |
| 1 | Right | New | Yes |
| 2 | Right | Old and not left | Yes |
| 3 | New | Left | Yes |
| 4 | Old and not right | New | Yes |
| 5 | Old and not right | Left | Yes |
| 6 | New | Old and not left | Yes |
| 7 | New | New | Yes |
| 8 | All other configurations | | |

FIG. 5

| Configuration index | Configuration | Predictors |
|---|---|---|
| 0 |   | • $Pred = 0$ |

| | | |
|---|---|---|
| 1 |   | • $Pred = P(a0)$ |

| | | |
|---|---|---|
| 2 |   | • $Pred = \frac{P(a0)+P(b0)}{2}$ |

| | | |
|---|---|---|
| 3 |   | • $Pred = P(\sigma(0))$<br>• $Pred = P(\sigma(1))$<br>• $Pred = P(\sigma(2))$<br>• $Pred = P(\sigma(M-1))$ |

| | | |
|---|---|---|
| 4 |   | • $Pred0 = P(a0) + P(b0) - P(c0)$<br>• $Pred1 = P(a1) + P(b1) - P(c1)$<br>• $Pred2 = -\frac{1}{2}\big(P(a0) + P(a1)\big) + P(b0) + P(b1)$<br>• $Pred3 = \frac{1}{6}\big(P(a0) + P(a1)\big) + \frac{2}{3}\big(P(b0) + P(b1)\big) - \frac{1}{3}\big(P(c0) + P(c1)\big)$ |

| Configuration index | Configuration | Predictors |
|---|---|---|
| 0 | 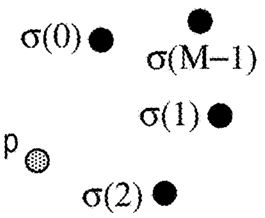 | • $Pred = P(\sigma(0))$<br>• $Pred = P(\sigma(1))$<br>• $Pred = P(\sigma(2))$<br>• $Pred = P(\sigma(M-1))$ |

FIG. 10A

| | | |
|---|---|---|
| 1 | 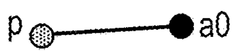 | • $Pred = P(a0)$ |

FIG. 10B

| | | |
|---|---|---|
| 2 | 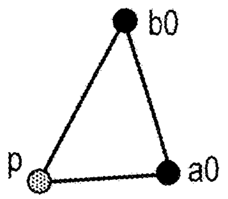 | • $Pred = \frac{P(a0)+P(b0)}{2}$ |

FIG. 10C

| | | |
|---|---|---|
| 3 | 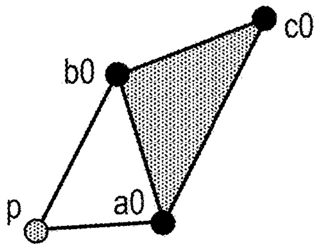 | • $SPred0 = \frac{1}{2}\left(P(a0) + 2P(b0) - P(c0)\right)$<br>• $SPred1 = \frac{1}{32}\left(24P(a0) + 29P(b0) - 21\,P(c0)\right)$<br>• $SPred2 = \frac{1}{32}\left(14P(a0) + 23P(b0) - 5\,P(c0)\right)$<br>• $SPred3 = \frac{P(a0)+P(b0)}{2}$<br>• $SPred4 = P(a0) + P(b0) - P(c0)$<br>• $SPred5 = P(b0)$<br>• $SPred6 = P(a0)$ |

FIG. 10D

| | | |
|---|---|---|
| 4 | 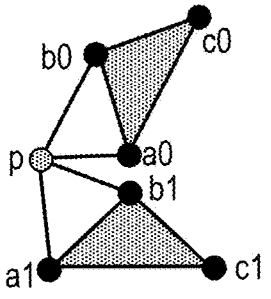 | • $MPred0 = \frac{1}{32}\left(2\left(P(a0)+P(a1)\right)+20\left(P(b0)+P(b1)\right)-6\left(P(c0)+P(c1)\right)\right)$<br>• $MPred1 = \frac{1}{32}\left(4\left(P(a0)+P(a1)\right)+21\left(P(b0)+P(b1)\right)-9\left(P(c0)+P(c1)\right)\right)$<br>• $MPred2 = \frac{1}{32}\left(11\left(P(a0)+P(a1)\right)+18\left(P(b0)+P(b1)\right)-13\left(P(c0)+P(c1)\right)\right)$<br>• $MPred3 = \frac{1}{32}\left(5\left(P(a0)+P(a1)\right)+18\left(P(b0)+P(b1)\right)-7\left(P(c0)+P(c1)\right)\right)$<br>• $MPred4 = \frac{1}{32}\left(\left(P(a0)+P(a1)\right)+22\left(P(b0)+P(b1)\right)-7\left(P(c0)+P(c1)\right)\right)$<br>• $MPred5 = \frac{1}{2}\left(P(b0)+P(b1)\right)$<br>• $MPred6 = \frac{1}{32}\left(6\left(P(a0)+P(a1)\right)+21\left(P(b0)+P(b1)\right)-11\left(P(c0)+P(c1)\right)\right)$<br>• $MPred7 = \frac{1}{2}\left(\left(P(a0)+P(a1)\right)+\left(P(b0)+P(b1)\right)-\left(P(c0)+P(c1)\right)\right)$<br>• $MPred8 = -\frac{1}{2}\left(P(a0)+P(a1)\right)+P(b0)+P(b1)$<br>• $MPred9 = P(a0)+P(b0)-P(c0)$<br>• $MPred10 = P(a1)+P(b1)-P(c1)$ |

FIG. 10E

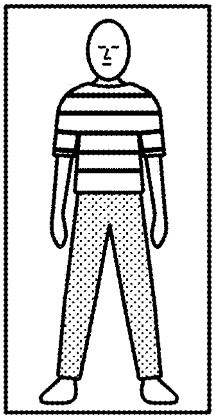
Original Mesh
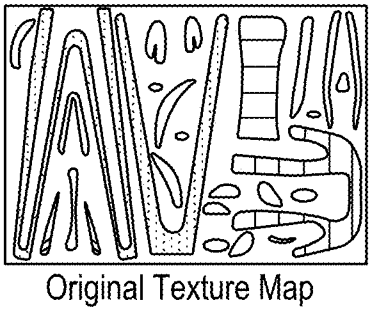
Original Texture Map
FIG. 12A
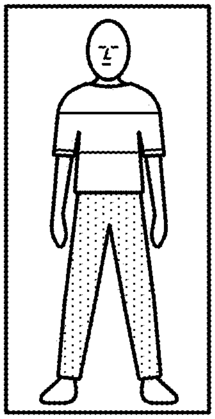
Re-Meshed Version
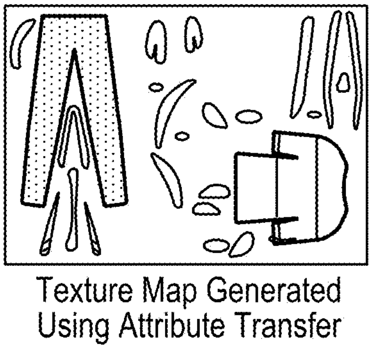
Texture Map Generated
Using Attribute Transfer
FIG. 12B For point $Q_1(u,v)$ (and all other nearest neighbors $Q_k(u,v)$) in the texture coordinate space, determine the four closest texture coordinates having corresponding pixels in the attribute image A

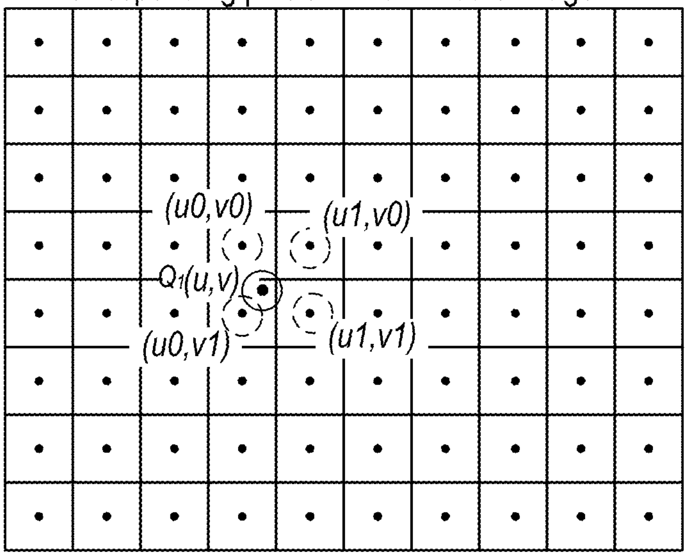

FIG. 18A

Determine(for each nearest neighbor $Q_k$)contributions of the known attribute value for P (from the original mesh) to the closest four pixels of the attribute image A for $Q_k$ using the equations below:

- $w00(P) = \frac{(u1(P)-u(P))(v1(P)-v(P))}{(u1(P)-u0(P))(v1(P)-v0(P))}$
- $w10(P) = \frac{(u(P)-u0(P))(v1(P)-v(P))}{(u1(P)-u0(P))(v1(P)-v0(P))}$
- $w01(P) = \frac{(u1(P)-u(P))(v(P)-v0(P))}{(u1(P)-u0(P))(v1(P)-v0(P))}$
- $w11(P) = \frac{(u(P)-u0(P))(v(P)-v0(P))}{(u1(P)-u0(P))(v1(P)-v0(P))}$,

- Accumulate the attribute values based on the weights as follows:
  - $A(i0(P), j0(P)) \leftarrow A(i0(P), j0(P)) + w00(P) \times a(P,k)$
  - $A(i1(P), j0(P)) \leftarrow A(i1(P), j0(P)) + w10(P) \times a(P,k)$
  - $A(i0(P), j1(P)) \leftarrow A(i0(P), j1(P)) + w01(P) \times a(P,k)$
  - $A(i1(P), j1(P)) \leftarrow A(i1(P), j1(P)) + w11(P) \times a(P,k)$
  - $W(i0(P), j0(P)) \leftarrow W(i0(P), j0(P)) + w00(P)$
  - $W(i1(P), j0(P)) \leftarrow W(i1(P), j0(P)) + w10(P)$
  - $W(i0(P), j1(P)) \leftarrow W(i0(P), j1(P)) + w01(P)$
  - $W(i1(P), j1(P)) \leftarrow W(i1(P), j1(P)) + w11(P)$

FIG. 18B

For point $P_1(u,v)$ (and all other nearest neighbors $P_k(u,v)$)in the texture coordinate space, determine the four closest texture coordinates having corresponding pixels in the attribute image A

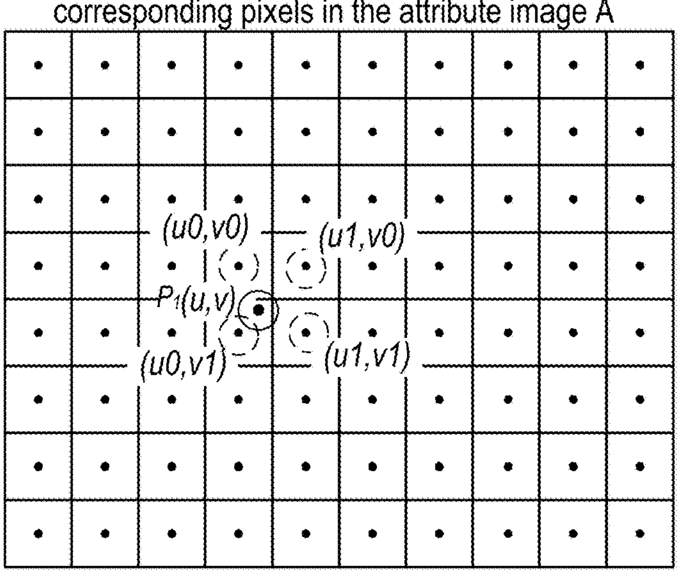

FIG. 20A

Determine contributions of the partially determined attribute value for Q (from the re-meshed mesh version) on the closest four pixels of the attribute image A using the equations below

- $w00(Q,k) = \frac{(u1(Q,k)-u(Q,k))(v1(Q,k)-v(Q,k))}{(u1(Q,k)-u0(Q,k))(v1(Q,k)-v0(Q,k))}$
- $w10(Q,k) = \frac{(u(Q,k)-u0(Q,k))(v1(Q,k)-v(Q,k))}{(u1(Q,k)-u0(Q,k))(v1(Q,k)-v0(Q,k))}$
- $w01(Q,k) = \frac{(u1(Q,k)-u(Q,k))(v(Q,k)-v0(Q,k))}{(u1(Q,k)-u0(Q,k))(v1(Q,k)-v0(Q,k))}$
- $w11(Q,k) = \frac{(u(Q,k)-u0(Q,k))(v(Q,k)-v0(Q,k))}{(u1(Q,k)-u0(Q,k))(v1(Q,k)-v0(Q,k))}$,

- Accumulate the attribute values based on the weights as follows:
  - $A(i0(Q,k),j0(Q,k)) \leftarrow A(i0(Q,k),j0(Q,k)) + w00(Q,k) \times \mathrm{a}(Q,k)$
  - $A(i1(Q,k),j0(Q,k)) \leftarrow A(i1(Q,k),j0(Q,k)) + w10(Q,k) \times \mathrm{a}(Q,k)$
  - $A(i0(Q,k),j1(Q,k)) \leftarrow A(i0(Q,k),j1(Q,k)) + w01(Q,k) \times \mathrm{a}(Q,k)$
  - $A(i1(Q,k),j1(Q,k)) \leftarrow A(i1(Q,k),j1(Q,k)) + w11(Q,k) \times \mathrm{a}(Q,k)$
  - $W(i0(Q,k),j0(Q,k)) \leftarrow W(i0(Q,k),j0(Q,k)) + w00(Q,k)$
  - $W(i1(Q,k),j0(Q,k)) \leftarrow W(i1(Q,k),j0(Q,k)) + w10(Q,k)$
  - $W(i0(Q,k),j1(Q,k)) \leftarrow W(i0(Q,k),j1(Q,k)) + w01(Q,k)$
  - $W(i1(Q,k),j1(Q,k)) \leftarrow W(i1(Q,k),j1(Q,k)) + w11(Q,k)$

FIG. 20B

ATTRIBUTE TRANSFER FUNCTION FOR RE-MESHED CONTENT WITH SMALL OR ISOLATED MESH TRIANGLES AND ASSOCIATED BIT STREAM STRUCTURE AND SYNTAX

PRIORITY CLAIM

This application claims benefit of priority to U.S. Provisional Application Ser. No. 63/602,228, entitled "Attribute Transfer Function for Re-Meshed Content with Small or Isolated Mesh Triangles and Associated Bit Stream Structure and Syntax," filed Nov. 22, 2023, and which is incorporated herein by reference in its entirety.

BACKGROUND

Technical Field

This disclosure relates generally to compression and decompression of three-dimensional meshes, which may include associated textures or attributes.

Description of the Related Art

Various types of sensors, such as light detection and ranging (LIDAR) systems, 3-D-cameras, 3-D scanners, etc. may capture data indicating positions of points in three-dimensional space, for example positions in the X, Y, and Z planes. Also, such systems may further capture attribute information in addition to spatial information for the respective points, such as color information (e.g., RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit. Also, three-dimensional visual content may also be captured in other ways, such as via 2D images of a scene captured from multiple viewing positions relative to the scene.

Such three-dimensional visual content may be represented by a three-dimensional mesh comprising a plurality of polygons with connected vertices that models a surface of three-dimensional visual content, such as a surface of a point cloud. Moreover, texture or attribute values of points of the three-dimensional visual content may be overlaid on the mesh to represent the attribute or texture of the three-dimensional visual content when modelled as a three-dimensional mesh.

Additionally, a three-dimensional mesh may be generated, for example in software, without first being modelled as a point cloud or other type of three-dimensional visual content. For example, the software may directly generate the three-dimensional mesh and apply texture or attribute values to represent an object.

Summary of Embodiments

In some embodiments, a system includes one or more sensors configured to capture points representing an object in a view of the sensor and to capture texture or attribute values associated with the points of the object. The system also includes one or more computing devices storing program instructions, that when executed, cause the one or more computing devices to generate a three-dimensional mesh that models the points of the object using vertices and connections between the vertices that define polygons of the three-dimensional mesh. Also, in some embodiments, a three-dimensional mesh may be generated without first being captured by one or more sensors. For example, a computer graphics program may generate a three-dimensional mesh with an associated texture or associated attribute values to represent an object in a scene, without necessarily generating a point cloud that represents the object.

In some embodiments, an encoder system includes one or more computing devices storing program instructions that encode the geometry and connectivity of the mesh by encoding a base mesh and displacements of vertices relative to the base mesh. A compressed bit stream may include a compressed base mesh, compressed displacement values, and compressed attribute information.

In some embodiments, in order to encode a polygon mesh, such as for the base mesh, a geometry encoder traverses mesh vertices of the polygon mesh being encoded according to a deterministic order re-producible at the decoder side and, at each step, it decomposes the faces incident to a current vertex into a set of polygon-fans sharing that current vertex as their pivot (e.g., a pivot vertex for the polygon fan). The polygonal fans are then triangulated and encoded, while exploiting incidence relationships implied by the polygon-fan structure wherein: all the faces are incident to the pivot vertex, and consecutive faces share an edge.

In some embodiments, the connectivity and geometry of polygon-fans are encoded in an interleaved manner. For each polygon-fan first its connectivity information is encoded as described herein, by using overall index values to signal identities of vertices and how the vertices connect to one another. Also, as discussed herein, instead of signaling the full value of the overall indices in the bitstream, a smaller active vertex index is maintained at the encoder and decoder, wherein a deterministic traversal order used at the encoder and decoder enables the decoder to convert signaled active vertices index values into overall indices values used to communicate connectivity relationships between the vertices to form polygons of the polygon mesh. Also, in some embodiments, the connectivity information may further be used to guide geometry information encoding.

For example, each polygon-fan may first be triangulated (e.g., the triangles fanning out around the pivot vertex are identified) and the triangles for each polygon fan may compressed by using a context adaptive binary arithmetic encoder. Also, connectivity of the obtained triangle-fans is compressed by using a selected prediction configuration, selected from a set of prediction configurations supported by both the encoder and decoder. In some embodiments, multiple prediction modes may be supported for a given prediction configuration. Also, in some embodiments, a polygon fan may be encoded by encoding a prediction configuration, a prediction mode (if applicable) and a number of triangles, with respect to a pivot vertex. The decoder may then reconstruct the polygon fan by generating the specified number of triangles fanning out around the pivot vertex using the specified prediction configuration. The vertices indices used in encoding the connectivity information may be implicitly derived by incrementing a vertex counter (for new vertices that have not yet been traversed, e.g., vertices that are being added as part of the triangles that fan out around the pivot vertex) or by assigning a left or right vertex of a triangle that fans out relative to the pivot vertex an index value of an already traversed triangle. For example, where a triangle being added shares a vertex with another triangle, the index value of the vertex of the other triangle needs to be signaled (instead of simply incrementing the vertex counter, since the vertex of the other triangle is already traversed vertex (e.g., a non-new vertex) as opposed to a new vertex that has not yet been traversed.

In some embodiments, both an encoder and decoder keep track of the active vertices (e.g., visited but not fully processed yet) in a list L ordered according to the order in which the vertices were visited. Instead of encoding the absolute index $\alpha$ of a vertex, the encoder instead encodes a relative index $\delta$ (e.g., an active index value instead of an overall index value).

In some embodiments, in order to encode the geometry values for the vertices of the polygon fan, one of a set of prediction configurations may be chosen, and signaled along with prediction residuals. For example, positions of already encoded neighboring vertices are used to predict positions of vertices currently being processed (e.g., according to a determined traversal order that is deterministic such that the encoder and decoder follow the same traversal order).

In some embodiments, an attribute transfer function as described in the attached appendix may be used to determine mappings between a compressed version of a mesh (e.g., re-meshed version) and corresponding attributes. Also, in some embodiments, the compressed mesh and compressed attribute information may be signaled in a bitstream using the syntax structure further described in the attached appendix.

BRIEF DESCRIPTION OF THE DRAWINGS

FIG. 2 illustrates an alternative example of input information for defining a three-dimensional mesh, wherein the input information is formatted according to an object format, according to some embodiments.

FIG. 5 is a table describing how vertices index values used in connectivity information are signaled for respective ones of the prediction configurations, according to some embodiments.

FIGS. 10A-10E illustrate example prediction configurations for predicting positions of seed vertices using positions of already processed seed vertices, according to some embodiments.

FIG. 12A illustrates an original mesh and texture/attribute map (e.g. first instance of three-dimensional visual volumetric content) that is to be compressed or otherwise modified, according to some embodiments.

FIG. 12B illustrates a modified version of the original mesh and a generated attribute map for the modified version of the original mesh (e.g. second instance of three-dimensional visual volumetric content), according to some embodiments.

FIGS. 18A-18B illustrate a process of determining attribute values and weighting values used to calculate pixel values of the modified texture/attribute map being generated for the modified version of the mesh, according to some embodiments.

FIGS. 20A-20B illustrate a process of determining attribute values and weighting values used to calculate pixel values of the modified texture/attribute map being generated for the modified version of the mesh, according to some embodiments.

Figure 1:
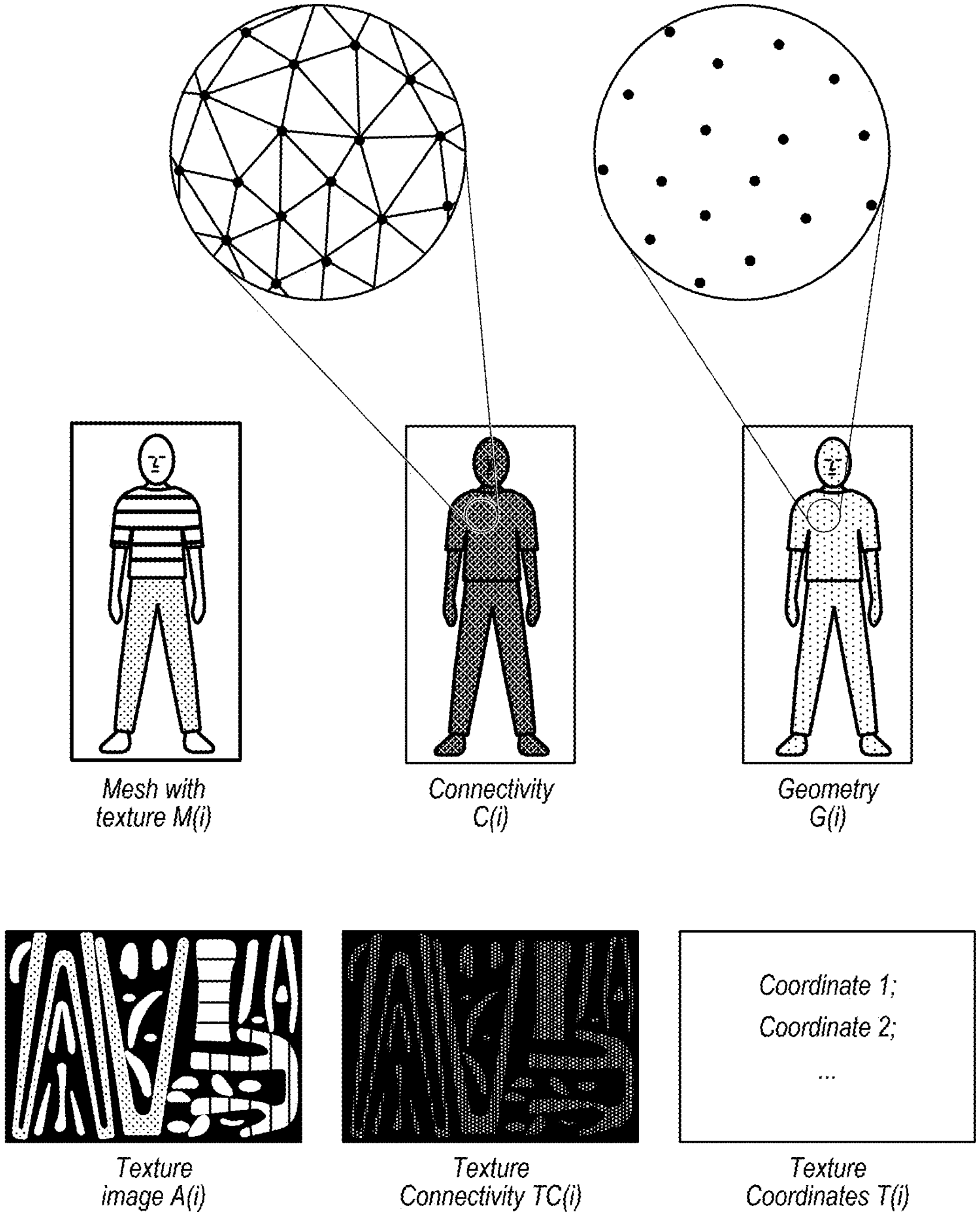
FIG. 1 illustrates example input information for defining a three-dimensional mesh, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture volumetric content comprising thousands or millions of points in 2-D or 3-D space, such as via LIDAR systems, has increased. Also, the development of advanced display technologies, such as virtual reality or augmented reality systems, has increased potential uses for volumetric content. However, volumetric content files are often very large and may be costly and time-consuming to store and transmit. For example, communication of volumetric content over private or public networks, such as the Internet, may require considerable amounts of time and/or network resources, such that some uses of volumetric content, such as real-time uses, may be limited. Also, storage requirements of volumetric content files may consume a significant amount of storage capacity of devices storing the volumetric content files, which may also limit potential applications for using volumetric content data.

In some embodiments, an encoder may be used to generate compressed volumetric content to reduce costs and time associated with storing and transmitting large volumetric content files. In some embodiments, a system may include an encoder that compresses attribute and/or spatial information of volumetric content such that the volumetric content file may be stored and transmitted more quickly than non-compressed volumetric content and in a manner that the volumetric content file may occupy less storage space than non-compressed volumetric content.

In some embodiments, such encoders and decoders or other encoders and decoders described herein may be adapted to additionally or alternatively encode three-degree of freedom plus (3DOF+) scenes, visual volumetric content, such as MPEG V3C scenes, immersive video scenes, such as MPEG MIV, etc.

In some embodiments, a static or dynamic mesh that is to be compressed and/or encoded may include a set of 3D Meshes M(0), M(1), M(2), . . . , M(n). Each mesh M(i) may be defined by a connectivity information C(i), a geometry information G(i), texture coordinates T(i) and texture connectivity CT(i). For each mesh M(i), one or multiple 2D images A(i, 0), A(i, 1) . . . , A(i, D−1) describing the textures or attributes associated with the mesh may be included. For example, FIG. 1 illustrates an example static or dynamic mesh M(i) comprising connectivity information C(i), geometry information G(i), texture images A(i), texture connectivity information TC(i), and texture coordinates information T(i). Also, FIG. 2 illustrates an example of a textured mesh stored in object (OBJ) format.

For example, the example texture mesh stored in the object format shown in FIG. 2 includes geometry information listed as X, Y, and Z coordinates of vertices and texture coordinates listed as two dimensional (2D) coordinates for vertices, wherein the 2D coordinates identify a pixel location of a pixel storing texture information for a given vertex. The example texture mesh stored in the object format also includes texture connectivity information that indicates mappings between the geometry coordinates and texture coordinates to form polygons, such as triangles. For example, a first triangle is formed by three vertices, where a first vertex (1/1) is defined as the first geometry coordinate (e.g., 64.062500, 1237.739990, 51.757801), which corresponds with the first texture coordinate (e.g., 0.0897381, 0.740830). The second vertex (2/2) of the triangle is defined as the second geometry coordinate (e.g., 59.570301, 1236.819946, 54.899700), which corresponds with the second texture coordinate (e.g., 0.899059, 0.741542). Finally, the third vertex of the triangle corresponds to the third listed geometry coordinate which matches with the third listed texture coordinate. However, note that in some instances a vertex of a polygon, such as a triangle may map to a set of geometry coordinates and texture coordinates that may have different index positions in the respective lists of geometry coordinates and texture coordinates. For example, the second triangle has a first vertex corresponding to the fourth listed set of geometry coordinates and the seventh listed set of texture coordinates. A second vertex corresponding to the first listed set of geometry coordinates and the first set of listed texture coordinates and a third vertex corresponding to the third listed set of geometry coordinates and the ninth listed set of texture coordinates.

In some embodiments, the geometry information G(i) may represent locations of vertices of the mesh in 3D space and the connectivity C(i) may indicate how the vertices are to be connected together to form polygons that make up the mesh M(i). Also, the texture coordinates T(i) may indicate locations of pixels in a 2D image that correspond to vertices of a corresponding sub-mesh. Attribute patch information may indicate how the texture coordinates defined with respect to a 2D bounding box map into a three-dimensional space of a 3D bounding box associated with the attribute patch based on how the points were projected onto a projection plane for the attribute patch. Also, the texture connectivity information TC(i) may indicate how the vertices represented by the texture coordinates T(i) are to be connected together to form polygons of the sub-meshes. For example, each texture or attribute patch of the texture image A(i) may correspond to a corresponding sub-mesh defined using texture coordinates T(i) and texture connectivity TC(i).

Figure 3:
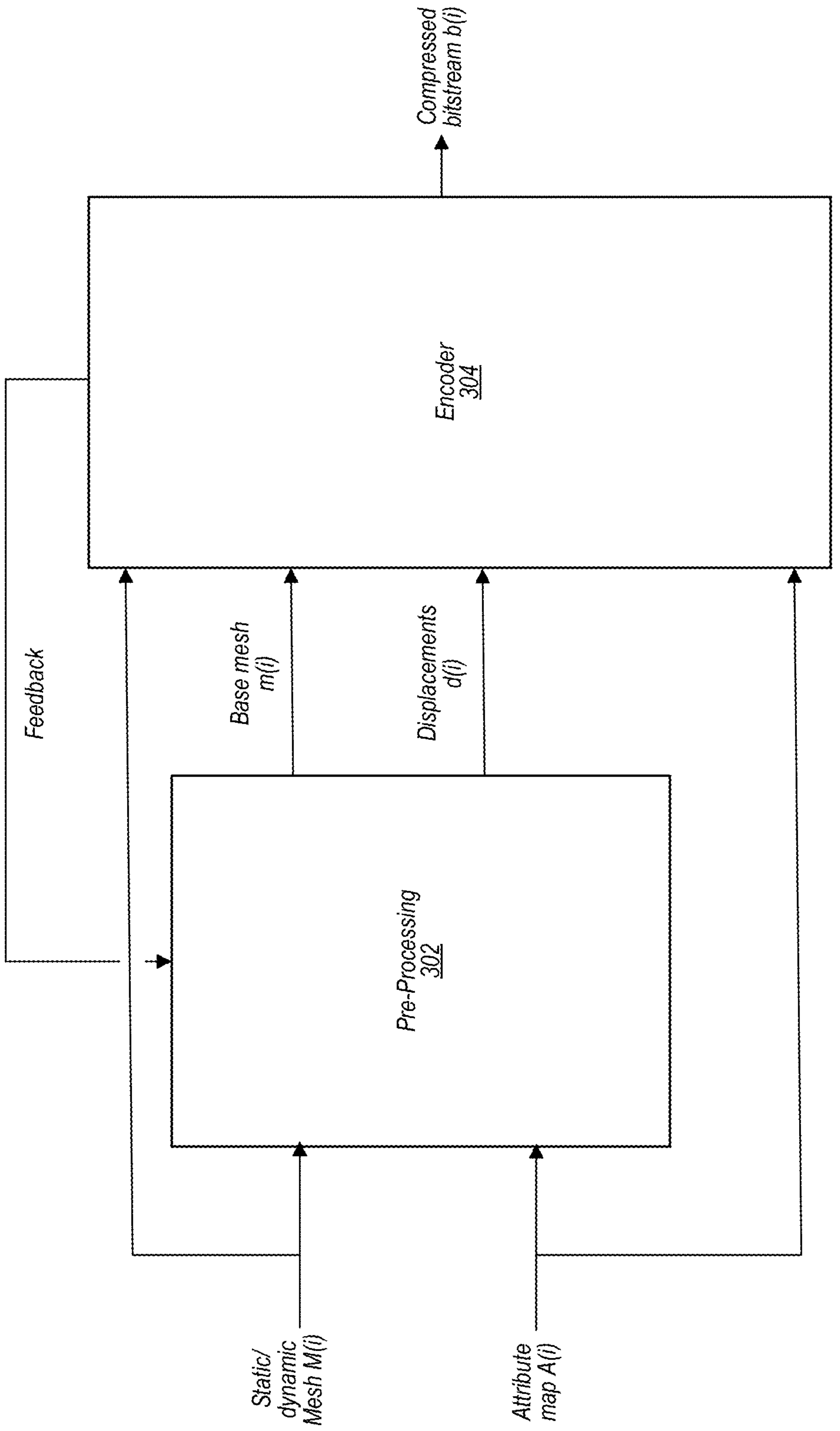
FIG. 3 illustrates an example pre-processor and encoder for encoding a three-dimensional mesh, according to some embodiments.

In some embodiments, a mesh encoder may perform a patch generation process, wherein the mesh is subdivided into a set of sub-meshes. The sub-meshes may correspond to the connected components of the texture connectivity or may be different sub-meshes than the texture connectivity of the mesh. In some embodiments, a number and a size of sub-meshes to be determined may be adjusted to balance discontinuities and flexibility to update the mesh, such as via inter-prediction. For example, smaller sub-meshes may allow for a finer granularity of updates to change a particular region of a mesh, such as at a FIG. 3 illustrates a high-level block-diagram of an encoding process in some embodiments. Note that the feedback loop during the encoding process makes it possible for the encoder to guide the pre-processing step and changes its parameters to achieve the best possible compromise according to various criteria, such as: rate-distortion, encoding/decoding complexity, random access, reconstruction complexity, terminal capabilities, encoder/decoder power consumption, network bandwidth and latency, and/or other factors.

A mesh that could be either static or dynamic is received at pre-processing 302. Also, an attribute map representing how attribute images (e.g., texture images) for the static/dynamic mesh are to be mapped to the mesh is received at pre-processing module 302. For example, the attribute map may include texture coordinates and texture connectivity for texture images for the mesh. The pre-processing module 302 separates the static/dynamic mesh M(i) into a base mesh m(i) and displacements d(i). Where the displacements represent how vertices are to be displaced to re-create the original static/dynamic mesh from the base mesh. For example, in some embodiments, vertices included in the original static/dynamic mesh may be omitted from the base mesh (e.g., the base mesh may be a compressed version of the original static/dynamic mesh). As will be discussed in more detail below, a decoder may predict additional vertices to be added to the base mesh, for example by sub-dividing edges between remaining vertices included in the base mesh. In such an example, the displacements may indicate how the additional vertices are to be displaced, wherein the displacement of the added vertices modifies the base mesh to better represent the original static/dynamic mesh. For dynamic meshes, an inter frame encoder may be used. For example, instead of signaling a new base mesh for each frame, instead a base mesh for a current time frame can be compared to a reconstructed quantized reference base mesh m'(i) (e.g., the base mesh the decoder will see from the previous time frame) and motion vectors to represent how the current base mesh has changed relative to the reference base mesh may be encoded in lieu of encoding a new base mesh for each frame. Note that the motion vectors may not be encoded directly but may be further compressed to take advantage of relationships between the motion vectors.

Figure 4:
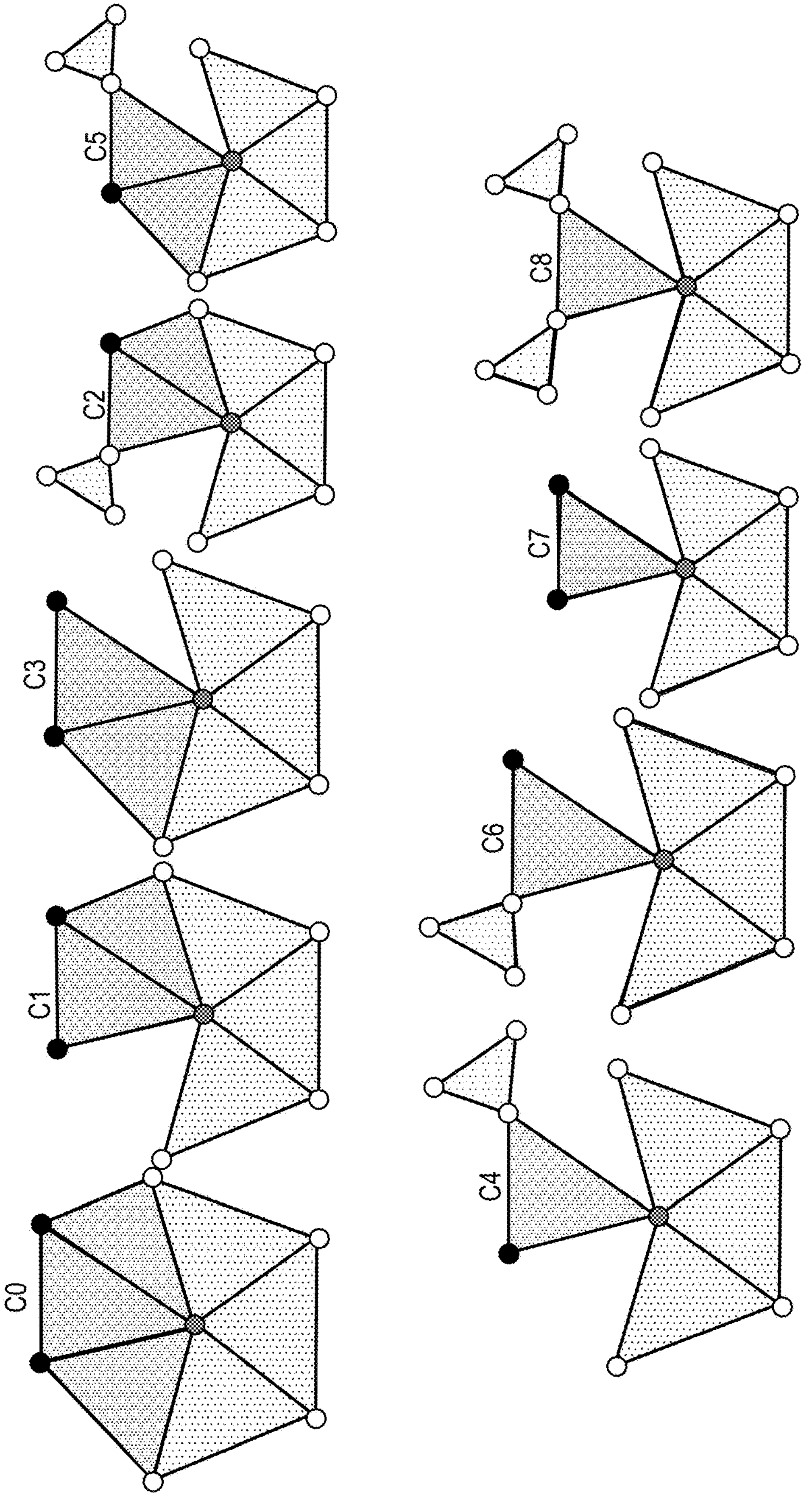
FIG. 4 illustrates example prediction configuration that may be supported by an encoder and decoder, according to some embodiments.
Figure 6:
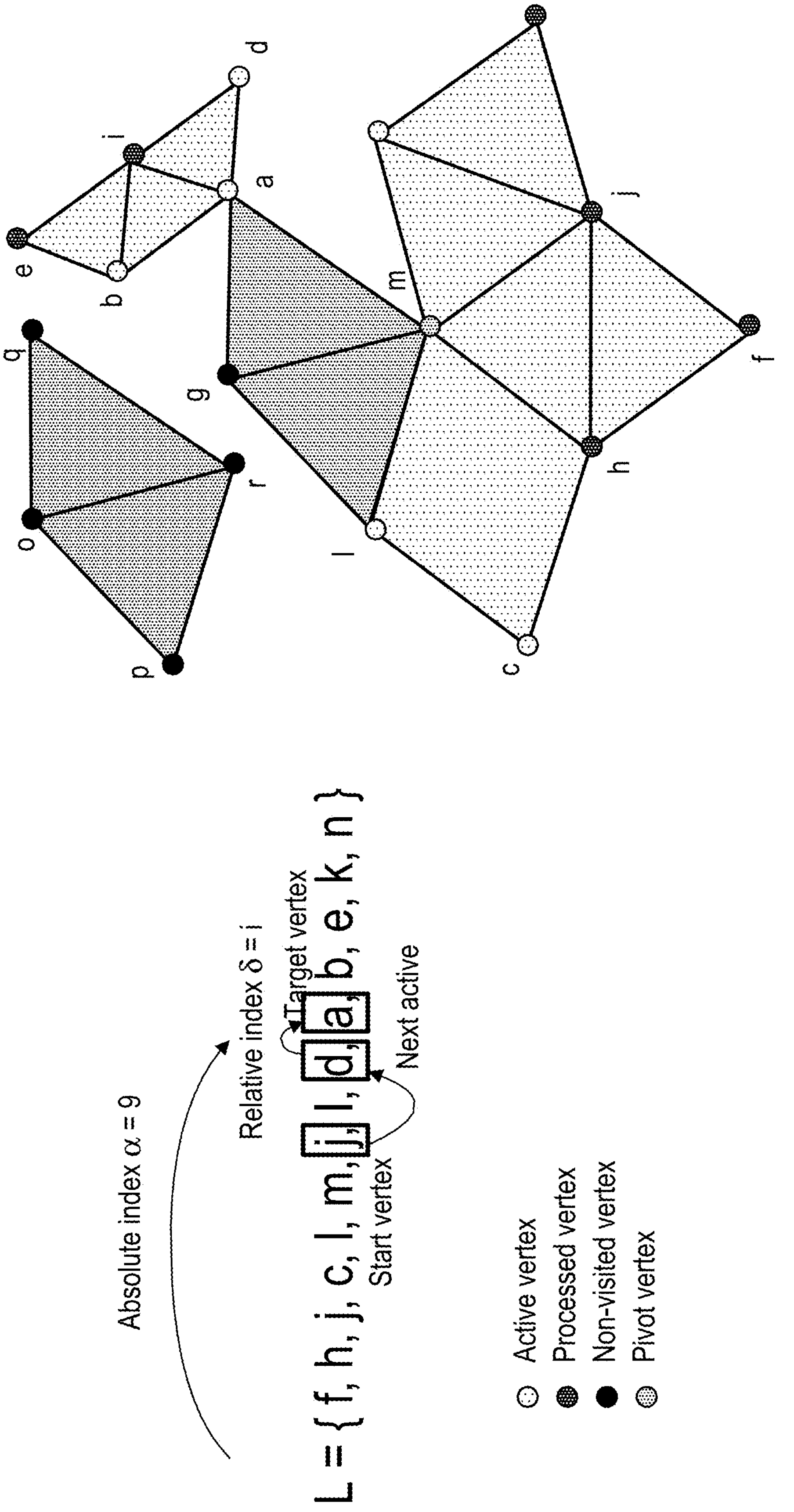
FIG. 6 illustrates an example active vertex index that is maintained when traversing vertices as part of encoding and decoding the visual volumetric content, according to some embodiments.

The separated base mesh m(i) and displacements d(i) that have been separated by pre-processing module 302 are provided to encoder 304, which may be an intra-frame encoder as shown in FIG. 4 or an inter-frame encoder as shown in FIG. 6. Also, the attribute map A(i) is provided to the encoder 304. In some embodiments, the original static/dynamic mesh M(i) may also be provided to the encoder 304, in addition to the separated out base mesh m(i) and displacements d(i). For example, the encoder 304 may compare a reconstructed version of the static/dynamic mesh (that has been reconstructed from the base mesh m(i) and displacements d(i)) in order to determine geometric distortion. In some embodiments, an attribute transfer process may be performed to adjust the attribute values of the attribute images to account for this slight geometric distortion. In some embodiments, feedback may be provided back to pre-processing 302, for example to reduce distortion, by changing how original static/dynamic mesh is decimated to generate the base mesh. Note that in some embodiments an intra-frame encoder and an inter-frame encoder may be combined into a single encoder that includes logic to toggle between intra-frame encoding and inter-frame encoding. The output of the encoder 304 is a compressed bit stream representing the original static/dynamic mesh and its associated attributes/textures.

With regard to mesh decimation, in some embodiments, a portion of a surface of a static/dynamic mesh may be thought of as an input 2D curve (represented by a 2D polyline), referred to as an "original" curve. The original curve may be first down-sampled to generate a base curve/polyline, referred to as a "decimated" curve. A subdivision scheme, such as those described herein, may then be applied to the decimated polyline to generate a "subdivided" curve. For instance, a subdivision scheme using an iterative interpolation scheme may be applied. The subdivision scheme may include inserting at each iteration a new point in the middle of each edge of the polyline. The inserted points represent additional vertices that may be moved by the displacements.

For example, the subdivided polyline is then deformed to get a better approximation of the original curve. More precisely, a displacement vector is computed for each vertex of the subdivided mesh such that the shape of the displaced curve approximates the shape of the original curve. An advantage of the subdivided curve is that it has a subdivision structure that allows efficient compression, while it offers a faithful approximation of the original curve. The compression efficiency is obtained thanks to the following properties:

The decimated/base curve has a low number of vertices and requires a limited number of bits to be encoded/transmitted.

The subdivided curve is automatically generated by the decoder once the base/decimated curve is decoded (e.g., no need to signal or hardcode at the decoder any information other than the subdivision scheme type and subdivision iteration count).

The displaced curve is generated by decoding and applying the displacement vectors associated with the subdivided curve vertices. Besides allowing for spatial/ quality scalability, the subdivision structure enables efficient wavelet decomposition, which offers high compression performance (e.g., with respect to rate-distortion performance).

Base Mesh Encoding

In some embodiments, a triangle fan (TFAN) encoding technique may be used to encode geometry positions of vertices of a base mesh (as described above), or otherwise encode a geometry of a static mesh. In TFAN encoding, respective pivot vertices may be selected, and triangles that fan out around the pivot vertices may be encoded using one of a set of supported prediction configurations, such as those shown in FIGS. 8A-8E, wherein to encode the positions of the vertices of the triangles fanning out from the pivot vertex (which may also be a seed vertex for a connected component), a position of the pivot vertex is first determined or signaled, and the positions of the vertices of the triangles incident to the pivot vertex are encoded by encoding a prediction configuration to be used, a number of triangles to be predicted using the signaled prediction configuration, and prediction residuals to be applied to the predicted positions of the vertices of the triangles incident to the pivot vertex. In some embodiments, various prediction modes as further shown in FIGS. 8A-8E may be signaled for use in performing prediction using a given one of the prediction configurations.

In some embodiments, a deterministic traversal order may be determined when performing TFAN encoding. In this way the connectivity information and geometry information may be encoded in an inter-leaved manner when performing TFAN encoding. For example, mesh traversal strategies may include valence-based traversal and geometry-based traversal. Both traversal strategies keep track of a single list of "active" vertices, which correspond to vertices to be visited and compressed next. The vertices in the list are stored in a priority queue and visited according to their priority (e.g., vertices with the highest priority are visited first). These two traversal strategies define two different priority measures. The valence-based traversal exploits the connectivity information and measures the priority of an "active vertex" by counting the number of already encoded triangles incident to it. The geometry-based traversal exploits both the connectivity and geometry information. It measures the priority of an "active vertex" by computing its conquered valence defined as the sum of the diamond angles of already encoded triangles incident to it.

As mentioned above, a TFAN encoder may support various prediction configuration, such as the nine prediction configurations shown in FIGS. 8A-8E. Also, connectivity information for the vertices predicted according to the prediction configurations may be derived at a decoder based on information signaled in the bitstream. For example, FIG. 5 illustrates a derivation process for determining the overall index values for the vertices predicted using the TFAN technique. New vertices are assigned overall index values by incrementing a vertices counter. However, non-new vertices (e.g., a vertex of a triangle being added using a TFAN technique that is corresponds to a vertex that has already been processed, for example by adding a triangle in a prior TFAN) is signaled by assigning the non-new vertex the left or right vertex index as shown in the Table of FIG. 5. For example, if the vertex is the left most vertex of the TFAN or the right most vertex of the TFAN, left and right designations may be used to identify the non-new (e.g., old) vertices that are referenced and the overall index values may be determined by a decoder based on the signaling of information indicating "left" or "right." However, for non-new vertices that are neither the left most or right most vertex, it may be necessary to signal the index value of the non-new vertex, for use in determining connectivity. However, signaling an absolute overall index value in the bitstream may be expensive as there may be a large number of overall vertices included in the index.

Active Vertex List

In some embodiments, an active vertex list may be used to signal non-new vertex index values that are not the left most or right most vertices relative to a pivot vertex. For example, an encoder and decoder may keep track of the active vertices (e.g., visited but not fully processed) in a list I ordered according to the order in which the vertices were visited. Instead of encoding the absolute index α of a vertex, instead a relative index δ (e.g., active index vertex values) derived as described in FIG. 6 are signaled.

The following process may be followed:

- The list L is initially empty
- Vertex indices are added and marked as active to L as they are visited during the encoding process.
- When a vertex is selected as pivot, its index is marked as processed in the list L
- If the index of a vertex a needs to be explicitly encoded
  - The encoder/decoder determines a start vertex
    - if the vertex a is the first TFan vertex, start_vertex=pivot-1
    - else if the vertex a is the last TFan vertex, start vertex=pivot+1
    - Otherwise, start vertex=last explicitly encoded index
  - Compute local index
    - if start_vertex is the same as a, then the relative index δ=0
    - if start_vertex<a, then
      - find the next_active_vertex (e.g., vertex d in FIG. 2)
        - if a vertex is not active or it is the pivot_vertex it is skipped
        - if the vertex a is the first TFan vertex, the right_vertex is also skipped
        - if the vertex a is the last TFan vertex, the left_vertex is also skipped
      - Set the relative index δ to the difference between the indices in L of the next_active_vertex and the vertex a (e.g., δ=1 in FIG. 2)
      - Note: δ>0
    - if start_vertex>a, then
      - find the previous_active_vertex (e.g., vertex d in FIG. 2)
        - if a vertex is not active or it is the pivot_vertex it is skipped
        - if the vertex a is the first TFan vertex, the right_vertex is also skipped
        - if the vertex a is the last TFan vertex, the left_vertex is also skipped
      - set the relative index δ to the difference between the indices in L of the previous_active_vertex and the vertex a
      - Note: δ<0
    - The relative index δ is encoded in the bitstream
      - Arithmetic coding
        - encode the absolute value of |δ|encode one bit to indicate if |δ| is 0 or not
        - if |δ|>0, encode one bit to indicate if |δ| is 1 or not
        - if |δ|>1, encode one bit to indicate if |δ| is 2 or not

- if |δ|>2, use arithmetic coding to encode min (|δ|−2,M−1)
- if |δ|>M+1, use Exponential Golomb codes of order k to encode |δ|−M−1 if |δ|>0, encode one bit to indicate the sign of δ

Figure 7:
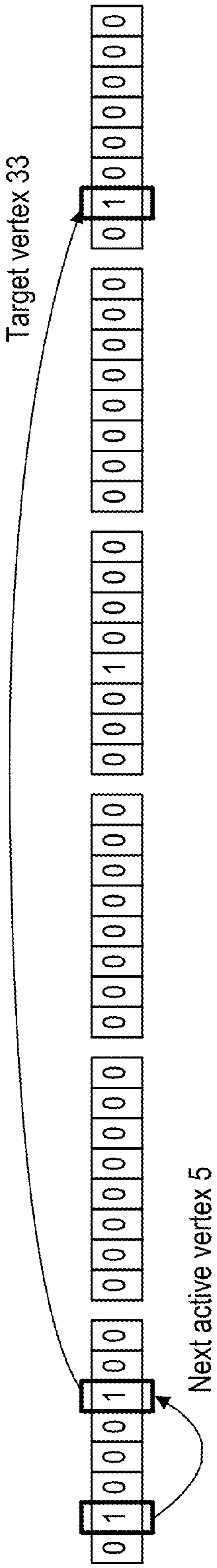
FIG. 7 illustrates an example more efficient method of converting an active index value to an overall index value, according to some embodiments.
Figure 8A:
FIGS. 8A-8E illustrate example supported prediction configurations for predicting vertices from a seed vertex, according to some embodiments.
Figure 8B:
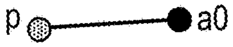
Figure 8C:
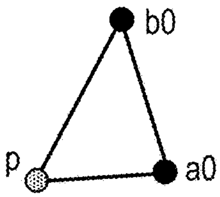
Figure 8D:
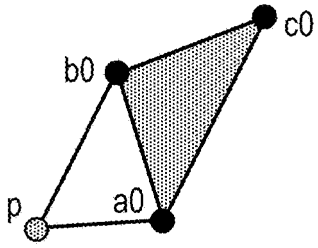
Figure 8E:
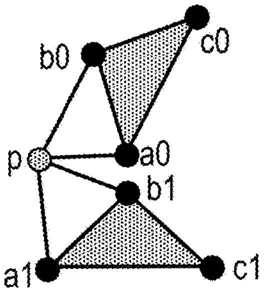

In some embodiments, the active list L could be efficiently implemented as array of buckets, where each bucket is 2N-bit word (e.g., 64-bit unsigned integer, or 32-bit unsigned integer) which represents the state of $2^N$ vertices. Hardware-accelerated operation that operates on all the bits of a bucket/word at once could be leveraged to accelerate the various operations needed as described below and in FIG. 7.

- Initialization: let V be the number of vertices and M is the smallest power of 2 higher than V. In the initialization step, an array of buckets/words of dimension M is initialized with zeros, indicating that all the vertices are not active.
- When a vertex becomes active, the associated bit is set to 1. After a vertex is processed, it is not active anymore and its associated bit is set to 0.
- To determine the state of a vertex, its associated bit is extracted and compared to 0.
- To find the next active vertex, HW-accelerated operation that operate on all the bits of a bucket/word at one could be leveraged to determine the first set bit (i.e., first bit set to 1). If all bits set to 0, move the next word. Otherwise, combine the index of the first set with the bucket index to determine the next active vertex index.
- To find the previous active vertex, HW-accelerated operation that operate on all the bits of a bucket/word at one could be leveraged to determine the last set bit (i.e., last bit set to 1). If all bits set to 0, move the previous word/bucket. Otherwise, combine the index of the last set bit with the bucket index to determine the previous active vertex index.
- To compute the local/relative index of a vertex, HW-accelerated operation that operate on all the bits of a bucket/word at one could be leveraged to compute the population count of the current work (i.e., number of bits set to 1). The relative index is computed by accumulating the population count for all the words encountered starting from a start vertex until we reach the target vertex.

Seed Vertex Prediction

Figure 9:
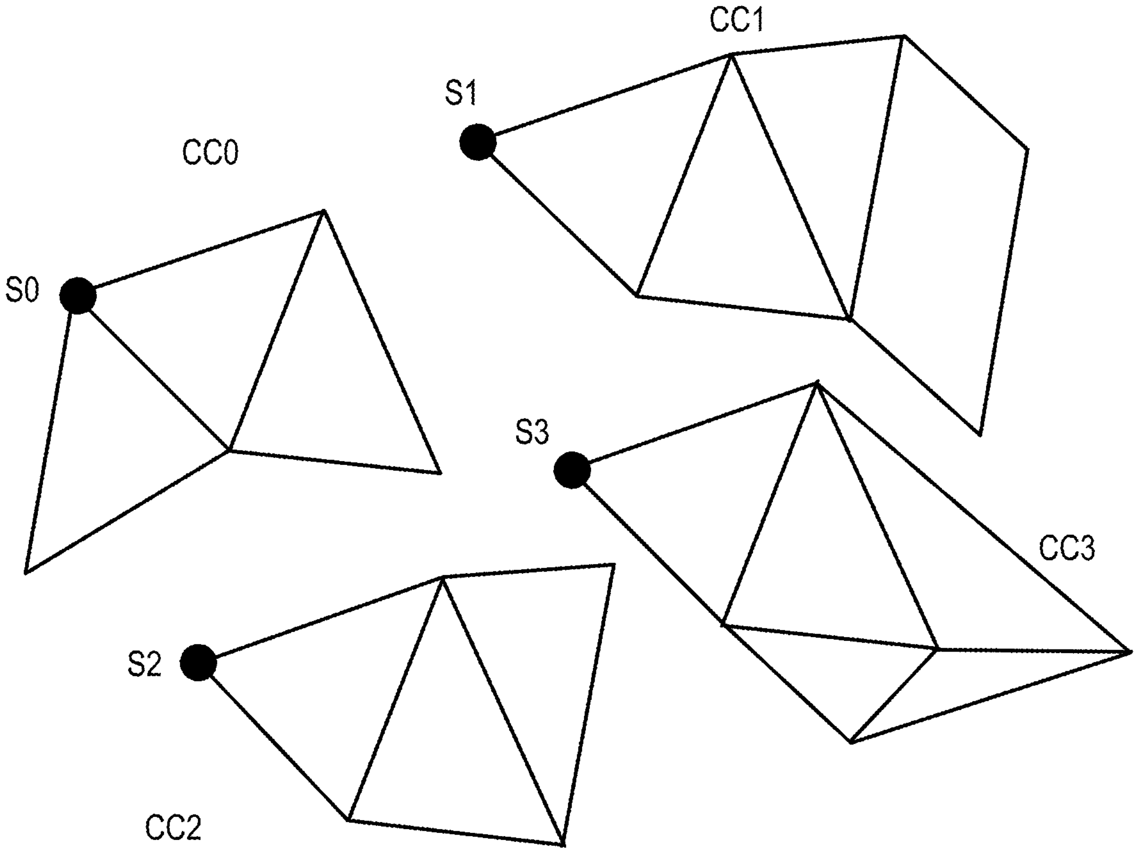
FIG. 9 illustrates a mesh comprising multiple connected components, according to some embodiments.

In some embodiments, the seed vertices from multiple connected components may be used to predict seed vertices for other connected components. For example, FIG. 9 illustrates connected components (CC0 through CC3) that each include a seed vertex (e.g., S0 through S3). In some embodiments in a similar manner as prediction configurations shown in FIGS. 8A-8E were used to predict vertices relative to a seed vertex, the prediction configurations shown in FIGS. 10A-10E may be used to predict a next seed vertex from a set of one or more already processed seed vertices. In some embodiments, an order in which the vertices are to be traversed may be re-ordered to improve compression using seed vertices prediction. For example, a space filing curve may be used to determine an order of the vertices (e.g., a Morton ordering, etc.). Also, nearest neighbor analysis may be used to determine an ordering of the vertices for traversal. For example, at the encoder side the vertices may be re-ordered to maximize correlations between successive vertices, for example using a Morton-based re-ordering or a nearest neighbor re-ordering. If using a nearest neighbor re-ordering, the following process may be followed:

Select the first seed S_0.
- first according to the input mesh order
- the vertex with the highest valence or degree (i.e., number of neighbors according to the connectivity)
- . . . .

Mark all vertices of the CC S_0 belongs to as visited.

For a sub-sequent seed S_k, select.
- The nearest non-visited vertex.

Mark all vertices of the CC S_k belongs to as visited.

Repeat the last two steps until all vertices are visited.

Once re-ordered, let K be the number of connected components (CCs) in the mesh and $(S_k)_{k=\{0, \ldots, K-1\}}$ the indices of the first vertex to be encoded in each CC (e.g., the seed for each CC).

A cache cache C of a predefined size (e.g., 4, 8, or 16) is maintained, which keeps track of the last N CC seeds. The cache is initially empty. Every time a CC seed is encoded, its index is added to C. If C is full the oldest seed is evicted from C. In some embodiments, other strategies for considering insertion and eviction of seed indices in C maybe considered, such as if a new seed is too close in terms of 3D position to existing seeds it may not be inserted in C or it may be removed from C.

The predictors from the cache to be used in predicting a seed vertex according to a given one of the prediction configurations shown in FIGS. 10A-10E may be selected, e.g., a subset Σ of size M of the indices in C. The subs-et may be a fixed selection or may be adaptive selection that maximizes the 3D coverage of the selected seeds used to predict the next seed vertex.

In some embodiments, both the encoder determines the index k of the best predictor in Σ for example based on:
- Minimizing the number of bits used to encode the prediction residual and the index k.
- Rate-Distortion performance in case of lossy compression.
- Minimizing other metrics used as proxy for the number of bits of the RD performance (e.g., $L^1$, $L^2$, $L^k$, and $L^\infty$ norms of the prediction residual)

The index k is signaled and indicates a given one of the prediction configurations shown in FIGS. 10A-10E that are to be used.

Also, in some embodiments, various prediction modes may be used for a selected prediction configuration. For example, single-way prediction may use one of the following modes:

Single-way prediction $$Mode0 = \{SPred0, SPred4, SPred5, SPred6\}$$

$$Mode1 = \{SPred1, SPred4, SPred5, SPred6\}$$

$$Mode2 = \{SPred2, SPred4, SPred5, SPred6\}$$

$$Mode3 = \{SPred3, SPred4, SPred5, SPred6\}$$

Also, multi-way prediction may use one of the following modes:

Multi-way prediction $$Mode0 = \{MPred0, SPred8, MPred9, MPred10\}$$

$$Mode1 = \{MPred1, MPred8, MPred9, MPred10\}$$

$$Mode2 = \{MPred2, MPred8, MPred9, MPred10\}$$

-continued $$Mode3 = \{MPred3, MPred8, MPred9, MPred10\}$$

$$Mode4 = \{MPred4, MPred8, MPred9, MPred10\}$$

$$Mode5 = \{MPred5, MPred8, MPred9, MPred10\}$$

$$Mode6 = \{MPred6, MPred8, MPred9, MPred10\}$$

$$Mode7 = \{MPred7, MPred8, MPred9, MPred10\}$$

In some embodiments, the encoder may switch between prediction modes with a predefined update period. For example, the same single-way and multi-way modes may be used for V-consecutive predictions. Then, after V predictions, the prediction mode may be updated for example by:

- explicitly writing in the bitstream the index of the new prediction mode; or
- implicitly a deterministic update strategy may be used that considers the performance of the various modes observed over the last prediction period or over a subset of the already encoded vertices, or over all the encoded vertices so far.

For each vertex, the encoder:

- determines the index k of the best predictor from the list of predictors of the current prediction mode
  - Minimize the number of bits used to encode the prediction residual and the index k.
  - Rate-Distortion performance in case of lossy compression
  - Minimize other metrics used as proxy for the number of bits of the RD performance (e.g., $L^1$, $L^2$, $L^k$, and $L^\infty$ norms of the prediction residual)
- Encode the index k
  - Arithmetic coding
  - Entropy coding
  - Universal codes
  - . . . .
- Encode the residuals In some embodiments, binarization may be used to encode the prediction configuration and/or prediction mode to be used to predict the seed vertices and/or to encode the prediction residuals.

- Encoding the prediction mode index
  - encode the bits from the most significant bit to the least significant bit
  - encode the most significant bit with the binary arithmetic context 0
  - encode the k-th bit with the binary arithmetic context selected based on the values of the last (k−1) encoded bits
- Encoding of the predictor index
  - Encoding process
    - Encode one bit to specify if the predictor index is 0
    - if it is not 0, encode one bit to specify if the predictor index is 1
    - if it is not 2, encode one bit to specify if 2 or 3

Figure 11:
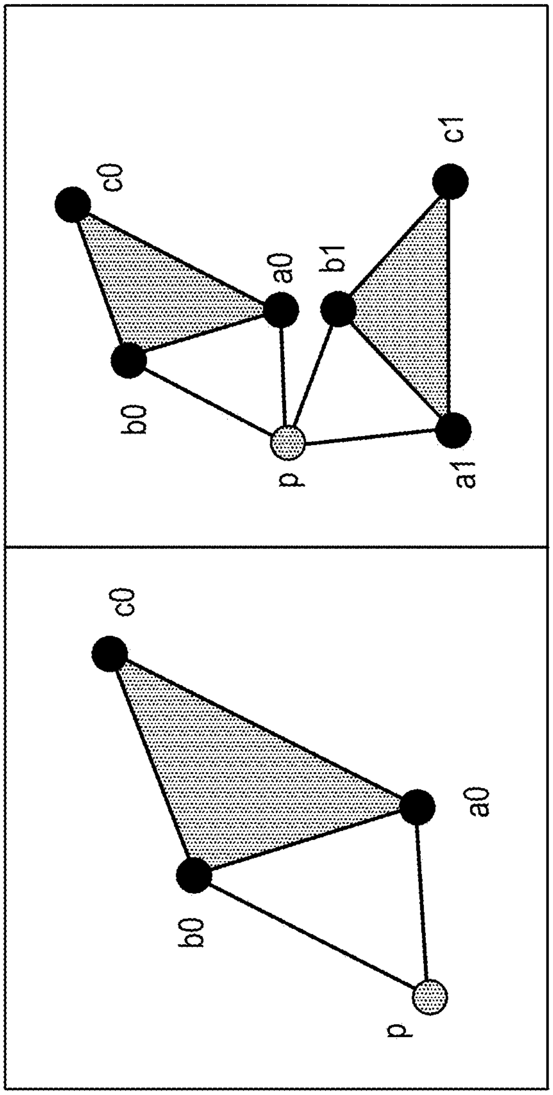
FIG. 11 illustrates an example method of determining prediction context based on angles of triangles being compressed, according to some embodiments.

In some embodiments, an arithmetic context selection may be used for the binarization encoding, wherein different contexts are maintained for each of the prediction configurations. Also, different context may be used based on the shapes of the adjacent triangles. For example, different triangle shapes are shown in FIG. 11, relative to a pivot vertex.

Attribute Transfer

In some circumstances, (as described above, with regard to FIG. 3) a mesh may be pre-processed to produce a more compression friendly version of the mesh. Such pre-processing usually involves re-meshing (e.g., re-sampling) and re-parameterization (e.g., computing a new atlas of parameterization with a fewer number of patches and low parameterization distortion). Once the mesh is re-sampled, new attribute maps coherent with the re-meshed and/or re-parameterized mesh can be computed. This process may be referred to as attribute transfer.

For example, FIG. 12A illustrates an original mesh and texture/attribute map (e.g. a first instance of three-dimensional visual volumetric content) that is to be compressed or otherwise modified, according to some embodiments. Additionally, FIG. 12B illustrates a modified version of the original mesh and a generated attribute map for the modified version of the original mesh (e.g. a second instance of three-dimensional visual volumetric content), according to some embodiments. Note that the re-meshed version may have a less detailed granularity with regard to geometry and/or attributes. For example, fewer (e.g. larger) polygons, such as triangles, may be used to represent the geometry of the re-meshed version. Also, this difference in the geometry of the re-meshed version may cause attributes associated with portions of the re-meshed version to be in different locations as compared to locations they were located at in the original mesh. To account for these changes, an attribute transfer process may be used, wherein the attribute transfer processes determines updated attribute values for the texture map for the re-meshed version based on the attributes included in the original texture map and based on the changes in geometry due to the re-meshing.

Figure 13:
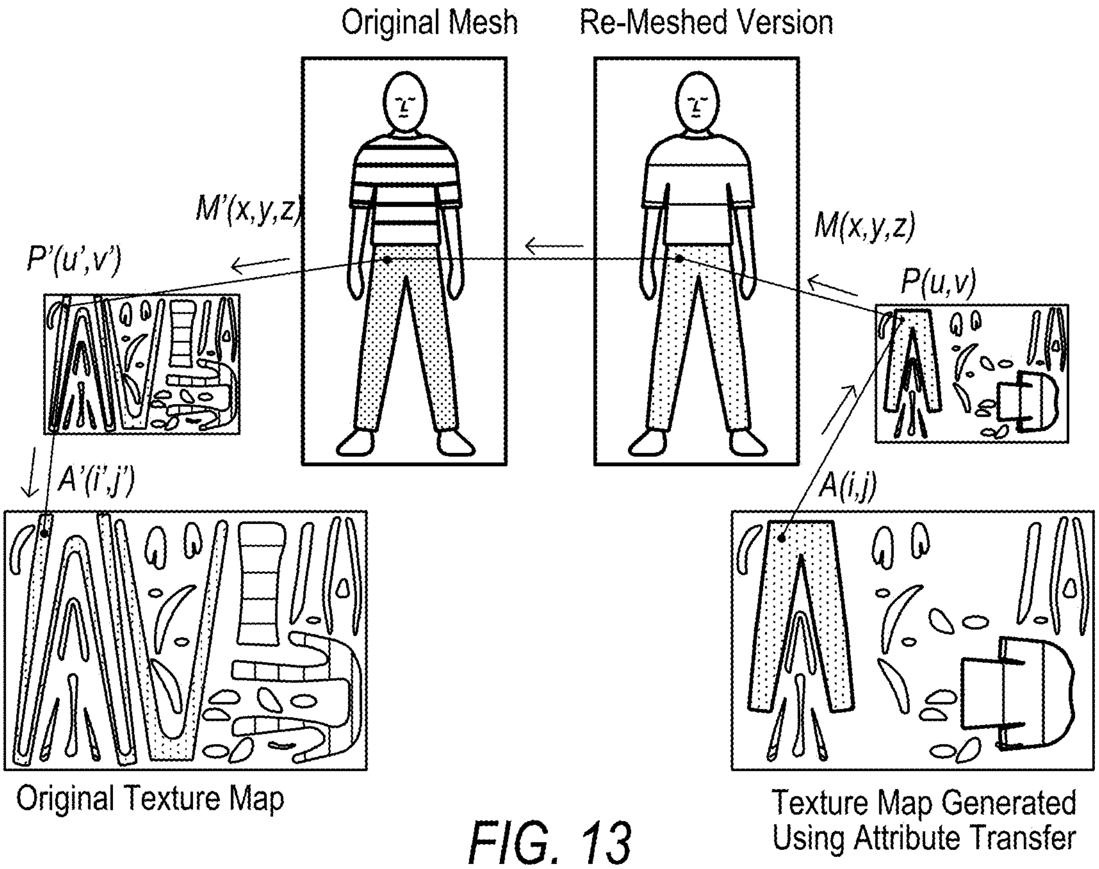
FIG. 13 illustrates an example mapping between a pixel value of an original texture/attribute map, and determined pixel values of a generated attribute map generated for a modified version of an original mesh corresponding to the original texture/attribute map, according to some embodiments.

FIG. 13 illustrates an example mapping between a pixel value of an original texture/attribute map, and determined pixel values of a generated attribute map generated for a modified version of an original mesh corresponding to the original texture/attribute map, according to some embodiments.

Figure 14:
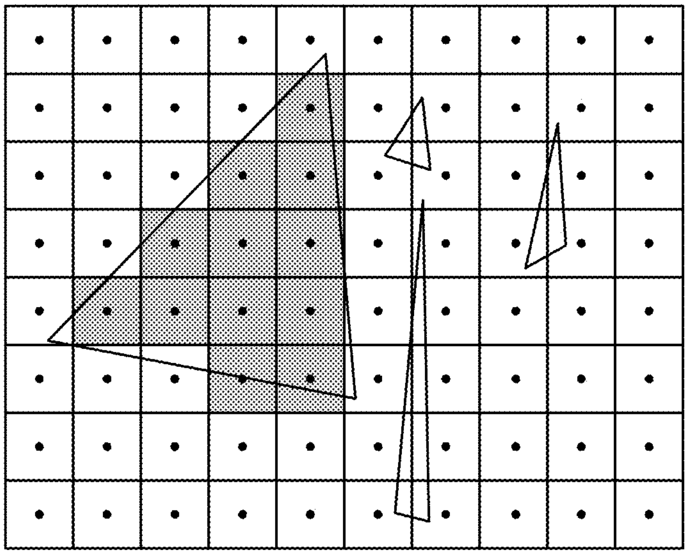
FIG. 14 illustrates a texture/attribute map generated based on mesh components (e.g. polygons) and shows how small or unusually sized polygons may not have their attribute values represented well in a generated texture/attribute map, without using the sampling process of FIGS. 15-20.

FIG. 14 illustrates a texture/attribute map generated based on mesh components (e.g. polygons) and shows how small or unusually sized polygons may not have their attribute values represented well in a generated texture/attribute map, without using the sampling process of FIGS. 15-20.

In some embodiments, a general attribute transfer process which works well for a large class of textured meshes may be used, for example as described in FIG. 13. However, for meshes with small/elongated and isolated triangles, such a process may fail to capture those regions, as shown in FIG. 14. Thus, in some embodiments, an attribute transfer process as further described below may be used to address these shortcomings of the general attribute transfer process.

For example, in FIG. 13 an attribute to be included as a pixel value in the generated texture/attribute map (A(i,j)) is determined by mapping that pixel value to its corresponding texture coordinates (P(u,v)) in the texture space, which in turn maps to a mesh portion (such as a triangle) M(x,y,z) in 3D space. The corresponding mesh portion in the original mesh can be identified in 3D space, e.g., as a triangle M'(x,y,z), which can be mapped back to its texture coordinates P'(u',v'), which in turn can be mapped to pixel values of the original texture map A'(i',j'). However, as can be seen in FIG. 14, some mesh portions (e.g. the non-shaded triangles) may be sized such that they do not map well to texture coordinates and corresponding attribute values of the original texture map. Thus, the approach further described in FIGS. 15-20 may be used to sample the original mesh and the re-meshed version of the original mesh, wherein sampling yields point cloud representations. By selecting an appropriate sampling rate, the problem of missing small or oddly shaped triangles is avoided. In some embodiments, to improve over the baseline attribute transfer process, it may be useful to avoid sampling the mesh in the attribute map domain or in the texture domain and to instead sample it directly in 3D space.

Figure 15:
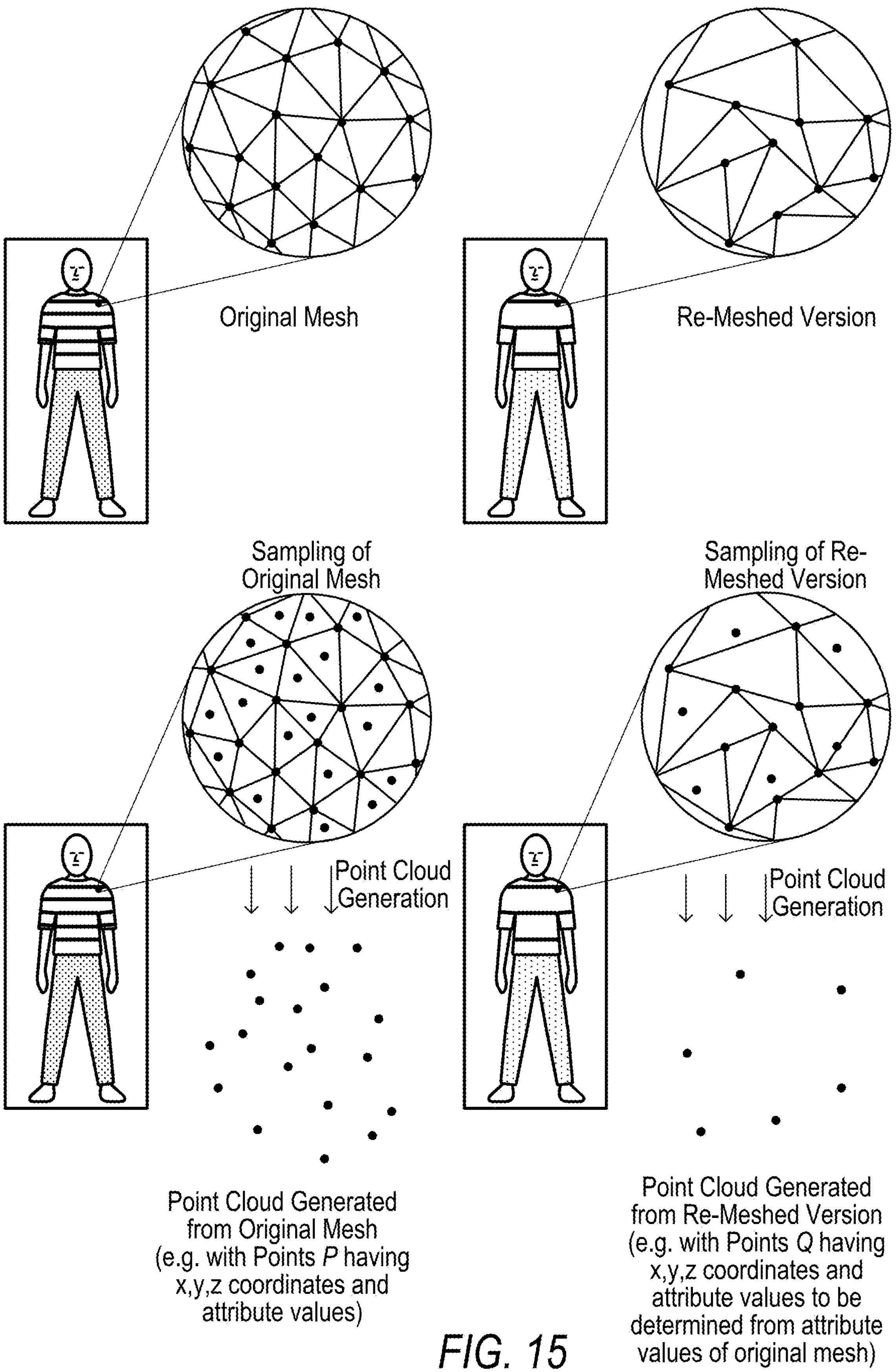
FIG. 15 illustrates sampling a first instance of visual volumetric content and a second instance of visual volumetric content in order to generate respective point clouds used to determine attribute values of a generated texture/attribute map for the second instance of visual volumetric content, according to some embodiments.

FIG. 15 illustrates sampling a first instance of visual volumetric content and a second instance of visual volumetric content in order to generate respective point clouds used to determine attribute values of a generated texture/attribute map for the second instance of visual volumetric content, according to some embodiments.

For example, both the original mesh and the re-meshed version may be sampled as shown in FIG. 15 to generate representative point clouds that represent the original mesh and the re-meshed version. In the generated point clouds, each point has a 3D position and 2D texture coordinates. In some embodiments, the sampling may be adjusted such that a number of samples taken per polygon of the geometrical mesh is based on an area of the polygon. For example, more samples may be taken for larger triangles and fewer samples may be taken for smaller triangles. Also, such an approach may guarantee that samples are taken for most, if not all, triangles.

Figure 16:
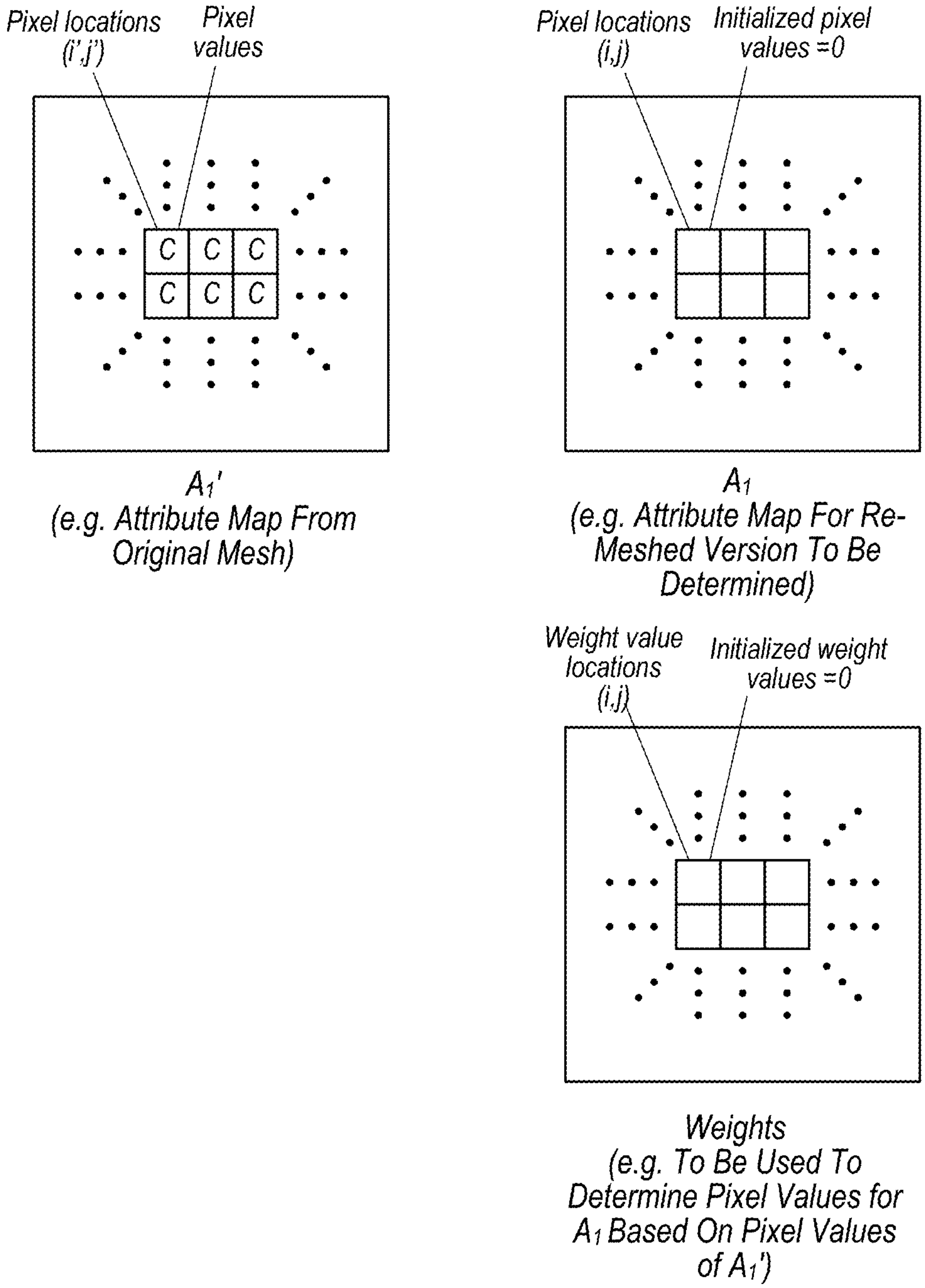
FIG. 16 illustrates an original attribute map, an initialized attribute map and weighting map to be used to generate a texture/attribute map for a modified version of a mesh, wherein the original attribute map corresponds to an original version of the mesh, according to some embodiments.
Figure 17A:
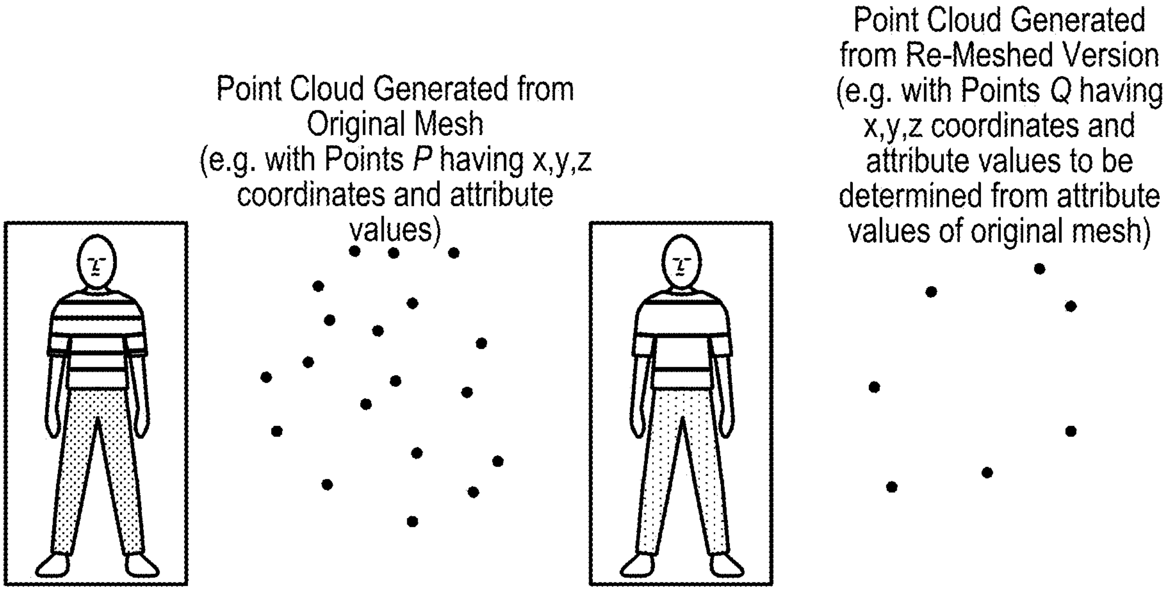
FIGS. 17A-17D illustrate a process of projecting a point from a first point cloud (corresponding to an original mesh) into a second point cloud (corresponding to a modified version of the mesh) in order to identify nearest neighboring points of the point from the first point cloud that are present in the second point cloud, according to some embodiments.
Figure 17B:
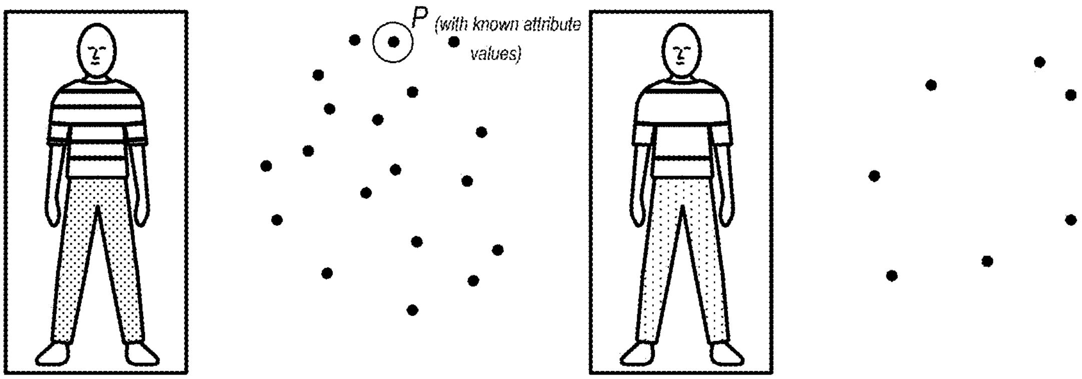
Figure 17C:
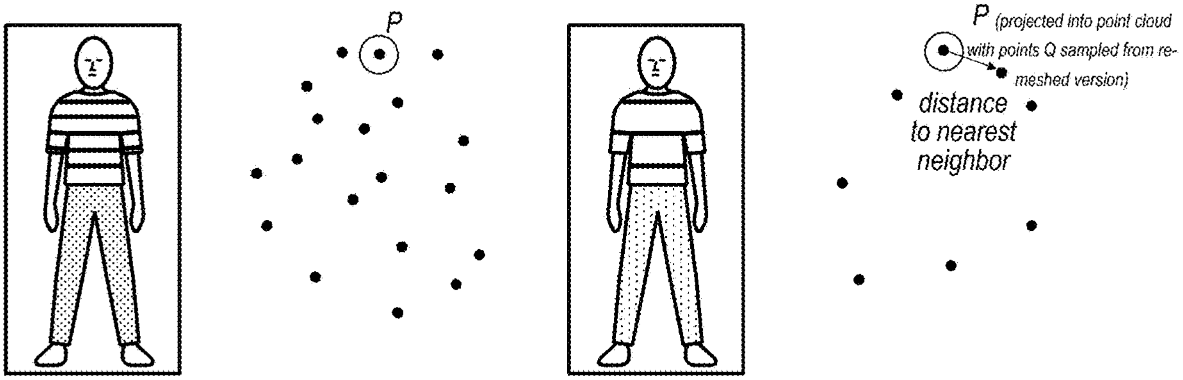
Figure 17D:
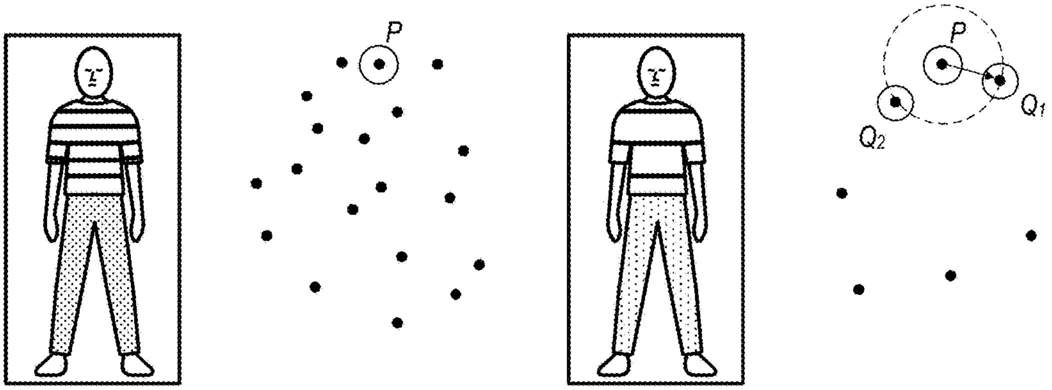
Figure 19A:
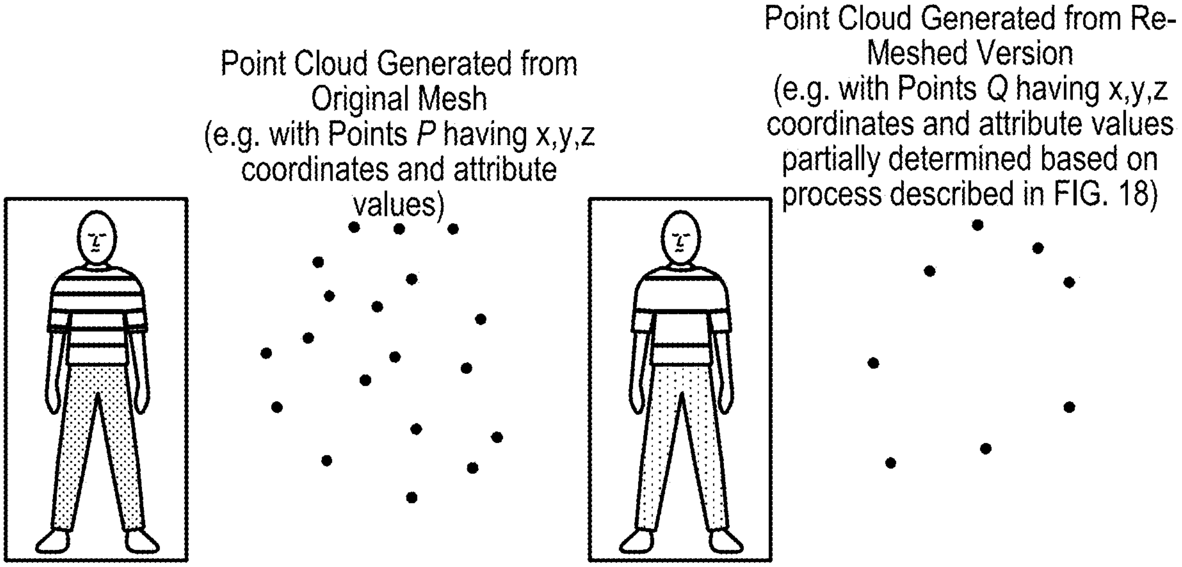
FIGS. 19A-19D illustrate a process of projecting a point from the second point cloud (corresponding to the modified mesh) into the first point cloud (corresponding to the original mesh) in order to identify nearest neighboring points of the point from the second point cloud that are present in the first point cloud, according to some embodiments.
Figure 19B:
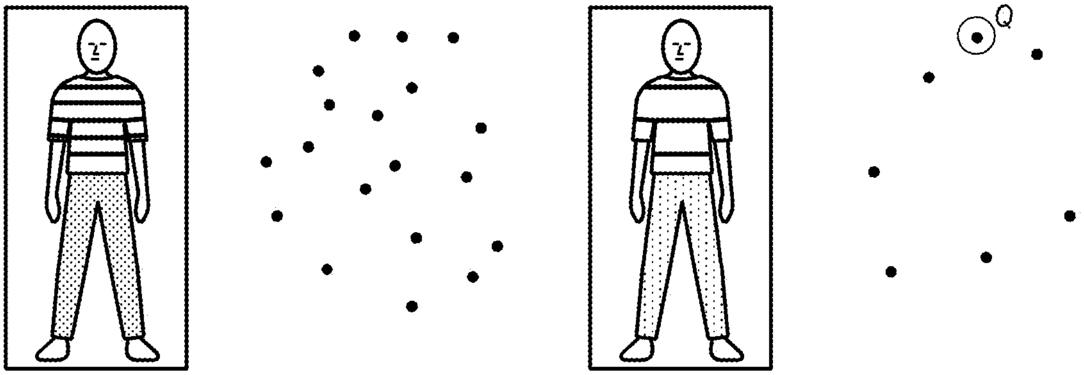
Figure 19C:
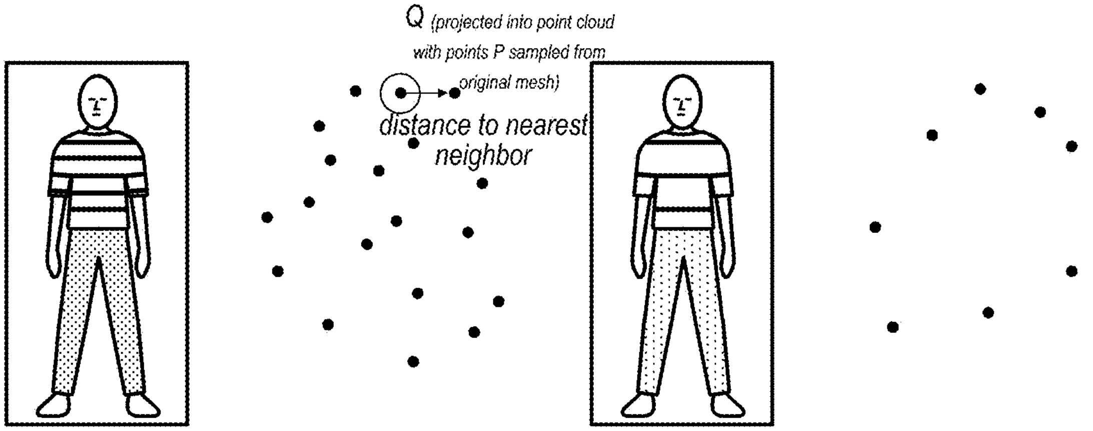
Figure 19D:
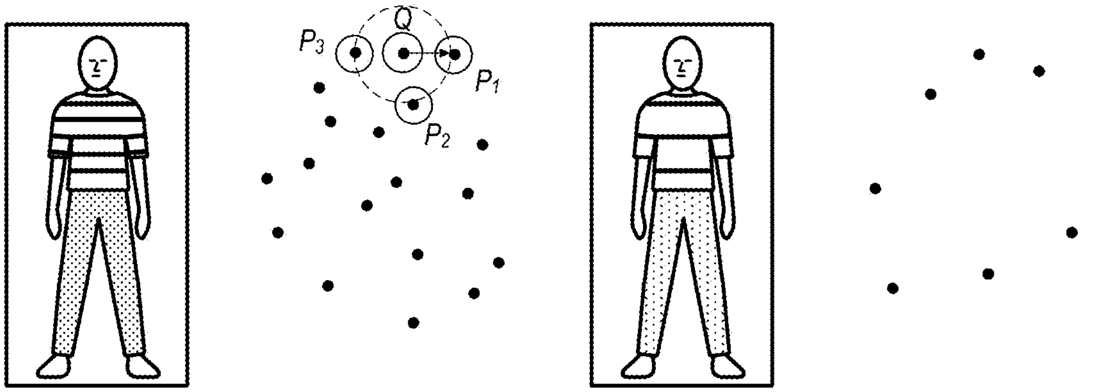

FIG. 16 illustrates an original attribute map, an initialized attribute map and weighting map to be used to generate a texture/attribute map for a modified version of a mesh, wherein the original attribute map corresponds to an original version of the mesh, according to some embodiments.

Let $A_1$ be the attribute map (also referred to as a texture map) to be generated. It is initialized with all zero values and has width W and height H that correspond to the number of pixels vertically and horizontally in the generated attribute map. Also, a weight map is generated also having width W and height H, wherein the values of the weight map are initialized at zero.

FIGS. 17A-17D illustrate a process of projecting a point from a first point cloud (corresponding to an original mesh) into a second point cloud (corresponding to a modified version of the mesh) in order to identify nearest neighboring points of the point from the first point cloud that are present in the second point cloud, according to some embodiments.

For each point P in the source point cloud, let (x,y,z) be its 3D coordinates and (u(P), v(P)) be its texture coordinates. As shown in FIGS. 17A-17D each point P is projected into the second point cloud for the modified mesh and a set of nearest neighboring points Q in the second point cloud are determined. For each of those points, the original attribute map is sampled to determine attribute values (e.g. an attribute vector, such as R, G, B color values) associated with a pixel of the generated attribute map A(P,k). For example, the following procedure may be followed:

Sample the attribute map A' to determine the attribute vector a(Q,k) associated with Q(P,k)

For example, the following methods could be considered:
- Bilinear interpolation
- Nearest neighbor interpolation
- Patch-aware bilinear interpolation
- Patch-aware nearest neighbor interpolation
- Machine-based interpolation,
- Learning-based interpolation,
- etc.

FIGS. 18A-18B illustrate a process of determining attribute values and weighting values used to calculate pixel values of the modified texture/attribute map being generated for the modified version of the mesh, according to some embodiments.

Next the texture coordinates for the points Q(P,k) are determined, wherein the texture coordinates are the closest four texture coordinates in the destination texture domain for the point Q, as shown in FIG. 18A. For example:

Compute the 4 texture coordinates:

$$(u0(P),\ v0(P)$$

$$(u1(P)v0(P)$$

$$(u0(P),\ v1(P)),\ \text{and}$$

$$(u1(P),\ v1(P))$$

of the four pixels surrounding (u,v). Let (i0(P)j0(P)(i0(P), j1(P)), (i1(P), j0(P)), and (i1(P), j1(P)) be the pixel coordinates of those pixels.

Next, the equations below and shown in FIG. 18B can be used to calculate the attribute values and weights.

Compute the 4 weights $w00$, $w01$, $w10$, $w11$ $$w00(P) = \frac{(u1(P) - u(P))(v1(P) - v(P))}{(u1(P) - u0(P))(v1(P) - v0(P))}$$

$$w10(P) = \frac{(u(P) - u0(P))(v1(P) - v(P))}{(u1(P) - u0(P))(v1(P) - v0(P))}$$

$$w01(P) = \frac{(u1(P) - u(P))(v(P) - v0(P))}{(u1(P) - u0(P))(v1(P) - v0(P))}$$

$$w11(P) = \frac{(u(P) - u0(P))(v(P) - v0(P))}{(u1(P) - u0(P))(v1(P) - v0(P))},$$

Accumulate the attribute values in the weights as follows:

$$A(i0(P),\ j0(P)) \leftarrow A(i0(P),\ j0(P)) + w00(P) \times a(P,\ k)$$

$$A(i1(P),\ j0(P)) \leftarrow A(i1(P),\ j0(P)) + w10(P) \times a(P,\ k)$$

$$A(i0(P),\ j1(P)) \leftarrow A(i0(P),\ j1(P)) + w01(P) \times a(P,\ k)$$

$$A(i1(P),\ j1(P)) \leftarrow A(i1(P),\ j1(P)) + w11(P) \times a(P,\ k)$$

$$W(i0(P),\ j0(P)) \leftarrow W(i0(P),\ j0(P)) + w00(P)$$

$$W(i1(P),\ j0(P)) \leftarrow W(i1(P),\ j0(P)) + w10(P)$$

$$W(i0(P),\ j1(P)) \leftarrow W(i0(P),\ j1(P)) + w01(P)$$

$$W(i1(P),\ j1(P)) \leftarrow W(i1(P),\ j1(P)) + w11(P)$$

A similar process is then performed going the other way, e.g. by projecting points Q from the second point cloud into the first point cloud.

FIGS. 19A-19D illustrate a process of projecting a point from the second point cloud (corresponding to the modified mesh) into the first point cloud (corresponding to the original mesh) in order to identify nearest neighboring points of the point from the second point cloud that are present in the first point cloud, according to some embodiments.

For each point Q in the target point cloud:

Let (xq, yq, zq) be the 3D coordinates of P and (uq, vq) be its texture coordinates.

Compute the attribute vector a(Q) associated with Q

For example, the following methods could be considered:
- Bilinear interpolation
- Nearest neighbor interpolation
- Patch-aware bilinear interpolation
- Patch-aware nearest neighbor interpolation Machine-based interpolation,
Learning-based interpolation,
etc.

Find a nearest neighbors P in the target point cloud.

Compute the distance d(P, Q) between P and Q.

Find all the points {P(0), P(1), . . . , P(K−1)} in the source point cloud that are within a radius of d(P, Q).

For each P(Q, k)

Let (u(Q, k), v(Q, k)) be the texture coordinates of P(k)

Compute the 4 texture coordinates (u0(Q, k), v0(Q, k)), (u1(Q, k), v0(Q, k)), (u0(Q, k), v1(Q, k)), and (u1(Q, k), v1(Q, k)) of the four pixels surrounding (u(Q, k), v(Q, k)). Let (i0(Q, k), j0(Q, k)), (i0(Q, k), j1(Q, k)), (i1(Q, k), j0(Q, k)), and (i1(Q, k), j1(Q, k)) be the pixel coordinates of those pixels FIGS. 20A-20B illustrate a process of determining attribute values and weighting values used to calculate pixel values of the modified texture/attribute map being generated for the modified version of the mesh, according to some embodiments.

Then, Compute the 4 weights w00, w01, w10, w11 and attribute values as follows:

$$w00(Q,k)=\frac{(u1(Q,k)-u(Q,k))(v1(Q,k)-v(Q,k))}{(u1(Q,k)-u0(Q,k))(v1(Q,k)-v0(Q,k))}$$

$$w10(Q,k)=\frac{(u(Q,k)-u0(Q,k))(v1(Q,k)-v(Q,k))}{(u1(Q,k)-u0(Q,k))(v1(Q,k)-v0(Q,k))}$$

$$w01(Q,k)=\frac{(u1(Q,k)-u(Q,k))(v(Q,k)-v0(Q,k))}{(u1(Q,k)-u0(Q,k))(v1(Q,k)-v0(Q,k))}$$

$$w11(Q,k)=\frac{(u(Q,k)-u0(Q,k))(v(Q,k)-v0(Q,k))}{(u1(Q,k)-u0(Q,k))(v1(Q,k)-v0(Q,k))},$$

Accumulate the attribute values in the weights as follows:

$$A(i0(Q,k),j0(Q,k))\leftarrow A(i0(Q,k),j0(Q,k))+w00(Q,k)\times a(Q,k)$$

$$A(i1(Q,k),j0(Q,k))\leftarrow A(i1(Q,k),j0(Q,k))+w10(Q,k)\times a(Q,k)$$

$$A(i0(Q,k),j1(Q,k))\leftarrow A(i0(Q,k),j1(Q,k))+w01(Q,k)\times a(Q,k)$$

$$A(i1(Q,k),j1(Q,k))\leftarrow A(i1(Q,k),j1(Q,k))+w11(Q,k)\times a(Q,k)$$

$$W(i0(Q,k),j0(Q,k))\leftarrow W(i0(Q,k),j0(Q,k))+w00(Q,k)$$

$$W(i1(Q,k),j0(Q,k))\leftarrow W(i1(Q,k),j0(Q,k))+w10(Q,k)$$

$$W(i0(Q,k),j1(Q,k))\leftarrow W(i0(Q,k),j1(Q,k))+w01(Q,k)$$

$$W(i1(Q,k),j1(Q,k))\leftarrow W(i1(Q,k),j1(Q,k))+w11(Q,k)$$

Finally, loop over all the pixels of A and compute the associated attribute vector as the weighted average $$\text{if } W(i,j)>0,\text{ then } A(i,j)\leftarrow A(i,j)/W(i,j).$$

Any remaining pixels (e.g. that did not have a corresponding point in the set of sampled points) may be filled using other methods, such as the triangle mapping method described above with regard to FIG. 13.

In some embodiments, one or more padding passes may be performed on the generated attribute map. The padding passes may traverse all pixels and if a pixel is empty and has non-empty neighbors, the value of the empty pixel may be determined based on the values of the neighboring non-empty pixels. In some embodiments, determining the padding may involve evaluating, a cost function that accounts for encoding costs of encoding pad pixel values for a pad space to select a smoothing method to be used to smooth pixel values for the respective pixels or blocks of pixels, wherein at least two or more smoothing methods are evaluated; and performing a smoothing operation on pixels of the pad space such that pixel values for respective ones of the pixels included in the pad space are smoothed based on respective pixel values of a set of neighboring pixels in a neighborhood of a given padded pixel being smoothed according to a selected smoothing method for the pixels or blocks of pixels.

In some embodiments, instead of (or in addition to) using the area-based interpolation techniques described above, an optimization problem technique may be used.

For example, instead of computing the attribute values as a weighted average, a sparse linear system can be solved to determine the optimal attribute vector vectors $(A(i,j))_{i=0\ldots W-1, j=0,\ldots,H-1}$, which minimize the following cost function C.

$$C=C1+C2$$

$$C1=\sum_{P\in SourcePointCloud}\sum_{k=0}^{N-1}(w00(P)\times A(i0(P),j0(P))+w10(P)\times A(i1(P),j0(P))+w01(P)\times A(i0(P),j1(P))+w11(P)\times A(i1(P),j1(P))-a(P,k))^2$$

$$C2=\sum_{Q\in TargetPointCloud}\sum_{k=0}^{N-1}(w00(Q,k)\times A(i0(Q,k),j0(Q,k))+w10(Q,k)\times A(i1(Q,k),j0(Q,k))+w01(Q,k)\times A(i0(Q,k),j1(Q,k))+w11(Q,k)\times A(i1(Q,k),j1(Q,k))-a(Q))^2$$

Any sparse linear solver could be used.

Bit Stream Structure and Syntax for Streaming of Compressed Mesh Information

Besides efficient compression, mesh codecs may support more advanced functionalities to enable various applications in various areas such as gaming, filmmaking, animation, geospatial applications, online commerce, AR and VR applications, entertainment, architecture, manufacturing, and cultural heritage applications, such as:

- Support for efficient compression of static 3D polygonal meshes without any constraints on their topology (e.g., manifold, non-manifold, open/closed, genus 0, or higher).
- Support at the minimum for the encoding of meshes with only geometry and connectivity information.
- Support zero or more vertex attribute data items associated with the mesh vertices including color, vertex normals, texture coordinates, skinning/animation weights, and other generic attributes (e.g., user-defined attributes). Binary, scalar, and vector attribute values may be supported.
- Support zero or more face attribute data associated with the mesh faces including material ID, sub-mesh ID, face normals, and other generic attributes (e.g., user-defined attributes). Binary, scalar, and vector attribute values may be supported.
- Support zero or more corner attribute (or face-varying attributes) data items associated with the mesh corners, where a corner is defined by a combination of a face and one of its vertices. Corner attributes include texture coordinates, surface normals, sharpness information, and other generic attributes (e.g., user-defined attributes). Binary, scalar, and vector attribute values may be supported.

- Support zero or more edge attribute data items associated with the mesh edges including crease information, or other generic attributes (e.g., user-defined attributes). Binary, scalar, and vector attribute values may be supported.
- Support compression of fixed-point input and output values for geometry and attributes. Floating point data shall be first converted to a fixed-point representation.
- Support lossless mesh compression.
- Support lossy mesh compression permitting efficient tradeoffs between bitrate and visual quality.
- Enable error resilience to cope with non-reliable transmission and storage.
- Support tools that enable encoding and decoding with low complexity, low latency, and/or real-time HW and SW implementation.
- Support parallel encoding and decoding.
- Support spatial (i.e., mesh resolution) and quality (i.e., precision on vertex positions and attribute values) scalability.
- Minimize the number of draw calls needed to render the mesh.

Attribute maps. Attribute maps are attributes of the static polygonal mesh surface stored as 2D images, such as color texture images.

Connectivity information. The connectivity information of a polygonal mesh is specified by a vector of integers indicating for each face the number of its vertices, and by a vector of indices describing how to connect the mesh vertices to create faces.

Corner attributes. Corner attributes are specified by a set of binary, scalar, or vector values associated with the mesh face corners, together with a set of indices indicating the mapping between corners and corner attribute values. The corner attribute values have finite precision and range.

Edge attributes. Edge attributes specify different sets of indices indicating the mapping between edges and edge attribute values. They are specified by binary, scalar, or vector values associated with the mesh edges. The edge attribute values have finite precision and range.

Face attributes. Face attributes are specified by binary, scalar, or vector values associated with the mesh faces. The face attribute values have finite precision and range.

Geometry information. The geometry information is specified by a vector of positions in the 3D space, associated with the mesh vertices. The position of each vertex is described by three Cartesian coordinates (X, Y, Z) exhibiting finite precision and range.

Lossless connectivity compression. The connectivity information is losslessly compressed if and only if the reconstructed connectivity and the attribute indices are the same as those of the input mesh, up to a permutation of the vertices and a circular permutation of the indices within faces.

Lossless corner attribute compression. The corner attributes are losslessly compressed if and only if the reconstructed corner attribute values and indices are the same as those of the input mesh, up to a permutation of the vertices and a circular permutation of the indices within faces.

Lossless geometry compression. The geometry information is losslessly compressed if and only if the reconstructed vertex positions are the same as those of the input mesh, up to a permutation of the vertices.

Lossless mesh compression. A mesh is losslessly compressed if and only if its connectivity, geometry, and attributes are all compressed in a lossless manner.

Lossless vertex attribute compression. The vertex attributes are losslessly compressed if and only if the reconstructed vertex attributes are the same as those of the input mesh, up to a permutation of the vertices.

Lossy mesh compression. A mesh is compressed in a lossy manner if its connectivity, geometry, and/or attributes are not losslessly compressed.

Mapping information. The mapping information indicates a mapping between the surface of a mesh and a 2D region of the plane.

Mesh quality scalability. A compressed mesh bitstream supports quality scalability if it is structured such that decoding a portion of the bitstream results in a mesh of a certain geometry and/or attribute information precision (quality), which can be progressively refined by further decoding the bitstream. Attribute maps shall not be considered when assessing mesh quality scalability.

Mesh spatial scalability. A compressed mesh bitstream supports spatial scalability if it is structured such that decoding a portion of the bitstream results in a mesh of a certain resolution (e.g., number of faces or vertices), which can be progressively refined by further decoding the bitstream. Attribute maps shall not be considered when assessing mesh spatial scalability.

Static polygonal mesh. A static polygonal mesh is a surface representation that consists of different components: connectivity information, geometry information, zero or more attribute maps, and zero or more vertex, face, corner, and/or edge attributes.

Vertex attributes. Vertex attributes are specified by binary, scalar, or vector values associated with the mesh vertices. The vertex attribute values have finite precision and range.

Figure 21:
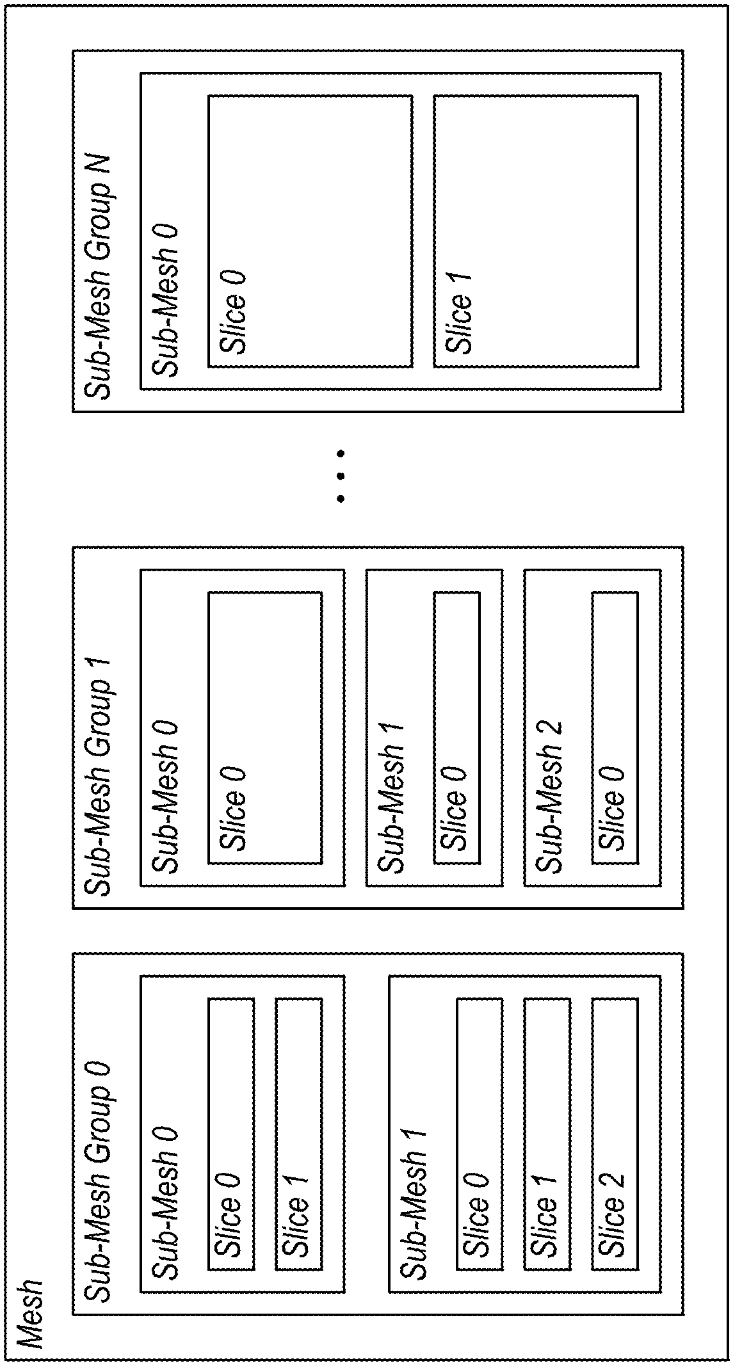
FIG. 21 illustrates an example encoding structure for components of a mesh, according to some embodiment.

FIG. 21 illustrates an example encoding structure for components of a mesh, according to some embodiment.

In some embodiments, a bitstream structure as described herein may be used to allow for optional or otherwise improved attribute encoding/decoding, error resilience, spatial and quality scalability, spatial random access and region of interest (ROI) encoding/decoding, parallel encoding and decoding, and/or specification region-based metadata.

- A mesh is decomposed into a set of sub-mesh groups.
- Each sub-mesh group is composed of a set of sub-meshes, which are introduced to group sub-meshes into objects or regions, which could be useful to:
  - Attach metadata information.
  - Selectively decode regions of the mesh.
- Each sub-mesh is composed of a set of slices
  - Sub-meshes could be decoded independently.
  - Different sub-meshes may have different attributes.
- Each slice is composed of a set of components:
  - One geometry component.
  - Zero or more attribute components.
  - Zero or more geometry refinement components.
  - Zero or more attribute refinement components.
- Slices
  - could be decoded independently.
  - could have exactly the same attributes defined.
- Components
  - Inter-component dependance could exist.

TABLE 1

| Mesh structure and enabled functionalities. | | | | | |
|---|---|---|---|---|---|
| | Sub-mesh group | Sub-mesh | Slice | Component | Refinements |
| Optional attribute encoding/decoding | | | | X | |
| Lossy compression | | | | | X |
| Spatial scalability | | | | | X |
| Quality Scalability | | | | | X |
| Spatial Random access | X | X | X | | |
| Region of Interest (ROI) Decoding | X | X | X | | |
| Parallel encoding and decoding | | X | X | | |
| Region-based metadata | X | | | | |

Figure 22:
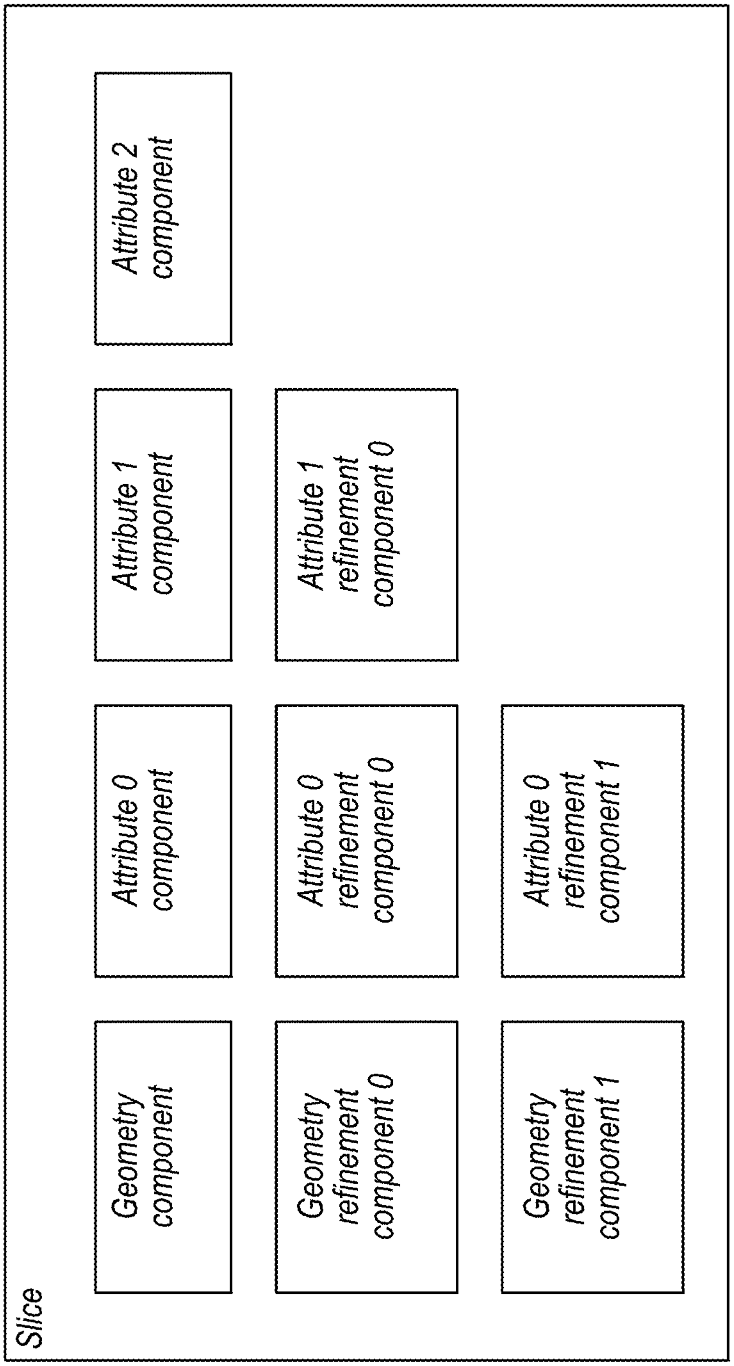
FIG. 22 further illustrates components of a slice, such as one of the slices shown in FIG. 21, according to some embodiments.

FIG. 22 further illustrates components of a slice, such as one of the slices shown in FIG. 21, according to some embodiments.

Figure 23:
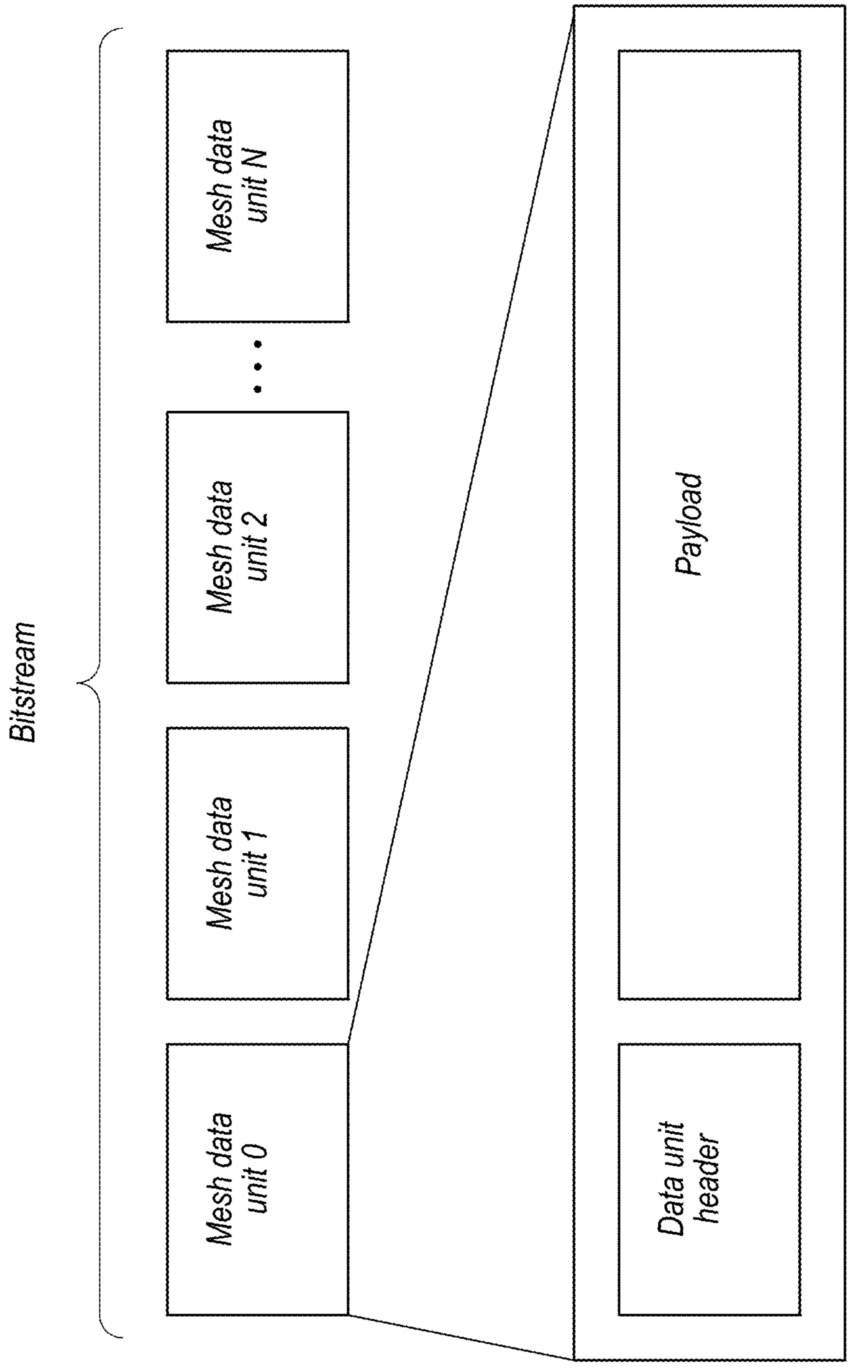
FIG. 23 illustrates example components of a bit stream, according to some embodiments.

FIG. 23 illustrates example components of a bit stream, according to some embodiments. The bitstream may be structured as a set of data units as illustrated in FIG. 23.

In some embodiments, the following data unit types may be used:

Sequence Parameter Set,
Geometry Parameter Set,
Attribute Parameter Set,
Geometry Component,
Attribute Component,
Geometry Refinement Component, and
Attribute Refinement Component.

Sequence Parameter Set

Describes sequence level information referenced by other data units.

| | Descriptor |
|---|---|
| sequence_parameter_set( ) { | |
| profile_tier_level( ) | Specify profile, tier, and level |
| sps_seq_parameter_set_id | Sequence parameter set identifier referenced by other data units |
| sps_frame_order_hint_present_flag | Flag indicating whether frame order hints are defined or not |
| sps_frame_order_hint_bits | Length in bits of gch_frame_order_hint and ach_frame_order_hint |
| sps_submesh_group_id_exp_golomb_order | Exponential golomb order when encoding gch_submesh_group_id and ach_submesh_group_id |
| sps_submesh_id_exp_golomb_order | Exponential golomb order when encoding gch_submesh_id and ach_submesh_id |
| sps_slice_id_exp_golomb_order | Exponential golomb order when encoding gch_slice_id and ach_slice_id |
| geometry_description( ) | Geometry description |
| attributes_descriptions( ) | Attributes description |
| sps_extension_present_flag | Extension flag |

| Profile, Tier, and Level | |
|---|---|
| | Descriptor |
| profile_tier_level( ){ | |
| ptl_profile_idc | Profile indicator |
| ptl_tier_idc | Tier indicator |
| ptl_level_idc | Level indicator |
| ptl_num_sub_profiles | Number of sub-profiles |
| ptl_constraints_present_flag | Flag indicating whether constraints are present or not |

| Geometry Description | |
|---|---|
| | Descriptor |
| geometry_description ( ){ | |
| gd_bit_depth_present_flag | Flag indicating whether gd_bit_depth_minus 1 is present or not |
| gd_bit_depth_minus1 | Maximum bit depth for X, Y, Z coordinates of the mesh geometry |
| gd_extension_present_flag | Extension Flag |

| Attributes Description | |
|---|---|
| | Descriptor |
| attributes_description ( ){ | |
| sps_num_attribute_descriptions | Number of attribute descriptions |
| For(a = 0; a < sps_num_attribute_descriptions; ++a) { | |
| ad_attribute_id | Attribute identifier referenced by other data units |
| ad_type | Attribute type (e.g., texture, coordinates, normal, user-defined attributes . . . ) |
| ad_scope | Attribute scope (i.e., vertex, corner, edge, or face attribute) |
| ad_bit_depth_present_flag | Flag indicating whether ad_bit_depth_minus1 is present or not |
| ad_bit_depth_minus1 | Maximum bit depth for all attribute coordinates |
| ad_num_components_minus 1 | Number of coordinates |
| } | |
| ad_extension_present_flag | Extension Flag |

| Geometry Parameter Set | |
|---|---|
| | Descriptor |
| geometry_parameter_set ( ){ | |
| gps_geom_parameter_set_id | Geometry parameter set identifier referenced by other data units |
| gps_origin_scale_present_flag | Flag indicating whether gch_origin and gch_origin_log2_scale are present or not |
| gps_origin_log2_scale | Default scaling factor used to derive slice geometry origin |
| gps_extension_present_flag | Extension Flag |

| Attribute Parameter Set | |
|---|---|
| | Descriptor |
| attribute_parameter_set ( ){ | |
| aps_attr_parameter_set_id | Attribute parameter set identifier referenced by other data units |
| aps_origin_scale_present_flag | Flag indicating whether ach_origin and ach_origin_log2_scale are present or not |
| aps_origin_log2_scale | Default scaling factor used to derive slice attribute origin |
| aps_extension_present_flag | Extension Flag |

| Geometry Component | |
|---|---|
| | Descriptor |
| geometry_component ( ){ | |
| geometry_component_header( ) | Geometry component header |
| geometry_component_payload( ) | Geometry component payload |
| } | |

| Geometry Component Header | |
|---|---|
| | Descriptor |
| geometry_component_header( ){ | |
| gch_seq_parameter_set_id | Sequence parameter set identifier |
| gch_geom_parameter_set_id | Geometry parameter set identifier |
| gch_frame_order_hint | Frame order hint |
| gch_submesh_group_id | Sub-mesh group identifier |
| gch_submesh_id | Sub-mesh identifier |
| gch_slice_id | Slice identifier |
| gch_origin_bits | Length in bits of gch_origin |
| for(int k = 0; k < 3; ++k) { | |
| gch_origin[k] | Component geometry origin given by gch_origin[k] * (1 << gch_origin_log2_scale) |
| gch_origin_log2_scale[k] | |
| } | |
| for(int k = 0; k < 3; ++k) { | |
| gch_component_bit_depth[k] | Geometry components bit depths |
| } | |
| gch_num_primitive_bits_minus1 | Length in bits of gch_num_vertices_minus1 and gch_num_faces |
| gch_num_vertices_minus1 | Number of vertices |
| gch_num_faces | Number of faces |
| gch_face_type | Mesh face type (e.g., triangular, quads, tri-quad, polygonal) |
| gch_num_indices_delta | Number of indices delta gch_num_indices_delta = num_indices - MIN_FACE_VERTEX * gch_num_faces |
| gch_traversal_strategy | Geometry traversal strategy |
| gch_prediction_strategy | Geometry prediction strategy |
| gch_singleway_prediction_mode | Geometry singleway prediction mode |
| gch_multiway_prediction_mode | Geometry multiway prediction mode |
| gch_singleway_prediction_log2_update_period | Geometry singleway prediction update period |
| gch_multiway_prediction_log2_update_period | Geometry multiway prediction update period |
| gch_extension_present_flag | Extension Flag |

Attribute Component

| | Descriptor |
|---|---|
| attribute_component ( ){ | |
| attribute_component_header( ) | Attribute component header |
| attribute_component_payload( ) | Attribute component payload |
| } | |

Attribute Component Header

| | Descriptor |
|---|---|
| attribute_component_header( ){ | |
| ach_seq_parameter_set_id | Sequence parameter set identifier |
| ach_attribute_id | Attribute id |
| ach_frame_order_hint | Frame order hint |
| ach_submesh_group_id | Sub-mesh group identifier |
| ach_submesh_id | Sub-mesh identifier |
| ach_slice_id | Slice identifier |
| ach_origin_bits | Length in bits of ach_origin |
| for(int k = 0; k < attribute_dim; ++k) { | |
| ach_origin[k] | Component attribute origin given by ach_origin[k] * (1 << ach_origin_log2_scale) |
| ach_origin_log2_scale[k] | |
| } | |
| for(int k = 0; k < attribute_dim; ++k) { | |
| ach_component_bit_depth[k] | Attribute components bit depths |
| } | |
| ach_num_vectors_bits_minus1 | Length in bits of ach_num_vectors_minus1 |
| ach_num_vectors_minus1 | Number of attribute vectors |
| ach_num_indices_bits_minus1 | Length in bits of ach_num_indices |
| ach_num_indices_minus1 | Number of attribute indices |
| ach_indices_coding_strategy | Attribute indices coding strategy |
| ach_traversal_strategy | Attribute traversal strategy |
| ach_prediction_strategy | Attribute prediction strategy |
| ach_singleway_prediction_mode | Attribute singleway prediction mode |
| ach_multiway_prediction_mode | Attribute multiway prediction mode |
| ach_singleway_prediction_log2_update_period | Attribute singleway prediction update period |
| ach_multiway_prediction_log2_update_period | Attribute multiway prediction update period |
| ach_extension_present_flag | Extension Flag |

Geometry Refinement Component

| | Descriptor |
|---|---|
| geometry_refinement_component ( ){ | |
| geometry_refinement_component_header( ) | Geometry refinement component header |
| geometry_refinement_component_payload( ) | Geometry refinement component payload |
| } | |

Geometry Refinement Component Header

| | Descriptor |
|---|---|
| geometry_refinement _component_header( ){ | |
| grch_seq_parameter_set_id | Sequence parameter set identifier |
| grch_frame_order_hint | Frame order hint |
| grch_submesh_group_id | Sub-mesh group identifier |
| grch_submesh_id | Sub-mesh identifier |
| grch_slice_id | Slice identifier |
| grch_num_vectors_minus1 | Number of displacement vectors |
| grch_single_component_displacement_flag | Flag indicating whether displacements have 1 or 3 component |
| grch_subdivsion_scheme | Subdivision scheme |
| grch_num_subdivsion_iterations | Number of subdivision iterations |
| grch_refinement_level_start_index | Refinement level start index |
| grch_num_refinement_levels_minus1 | Number of encoded refinement levels |
| grch_lifting_log2_inverse_prediction_weight | Log2 of the lifting prediction weight inverse |

-continued

| Geometry Refinement Component Header | |
|---|---|
| | Descriptor |
| grch_lifting_log2_inverse_update_weight | Log2 of the lifting update weight inverse |
| grch_lifting_skip_update_flag | Flag indicating whether the lifting update is skipped or not |
| grch_quant_param | Quantization parameter |
| grch_log2_quant_param_update_period | Quantization parameter update period |
| for(int i = 0; i < num_refinement_levels; ++i) { | |
| for(int j = 0; j < refinement_dim; ++j) { | |
| grch_quant_param_deltas[i][j] | Quantization parameter delta for the current refinement level |
| } | |
| grch_extension_present_flag | Extension Flag |

Embodiments of the present disclosure can further be described in view of the following clauses:

1. One or more non-transitory, computer-readable media, storing program instructions that, when executed using one or more computing devices, cause the one or more computing devices to:
   receive three-dimensional (3D) visual volumetric content to be compressed, the 3D visual volumetric content compressing a mesh and attribute information for attributes associated with portions of the mesh;
   compress the 3D visual content using a mesh encoder; and
   organize information for the compressed 3D visual content into a bit stream comprising:
   a plurality of mesh data units, the plurality comprising:
   a geometry component mesh data unit for a given slice of a sub-mesh of the mesh; and
   an attribute component mesh data unit for the given slice of the sub-mesh of the mesh.
2. The one or more non-transitory, computer-readable media of clause 1, wherein the plurality of mesh data units further comprises:
   one or mor additional attribute component mesh data units for the given slice of the sub-mesh of the mesh.
3. The one or more non-transitory, computer-readable media of clause 1, wherein the plurality of mesh data units further comprises:
   a geometry refinement component for the given slice of the sub-mesh of the mesh; or
   an attribute refinement component for the given slice of the sub-mesh of the mesh.
4. The one or more non-transitory, computer-readable media of clause 1, wherein the plurality of mesh data units further comprises:
   a geometry component mesh data unit for another given slice of a sub-mesh of the mesh; and
   an attribute component mesh data unit for the other given slice of the sub-mesh of the mesh.
5. The one or more non-transitory, computer-readable media of clause 4, wherein the plurality of mesh data units further comprises:
   a sequence parameter set mesh data unit defining parameters to be used to decode mesh data units slices belonging to the sub-mesh of the mesh.
6. The one or more non-transitory, computer-readable media of clause 1, wherein the plurality of mesh data units further comprises:
   geometry component and attribute component mesh data units for a plurality of slices, wherein for a plurality of sub-meshes one or more of the slices belong to the respective sub-mesh.
7. The one or more non-transitory, computer-readable media of clause 1, wherein a plurality of sub-meshes belong to a sub-mesh group.
8. The one or more non-transitory, computer-readable media of clause 1, wherein the plurality of mesh data units further comprises two or more of:
   a sequence parameter set mesh data unit;
   a geometry parameter set mesh data unit; or
   an attribute parameter set mesh data unit.
9. The one or more non-transitory, computer-readable media of clause 8, wherein the sequence parameter set mesh data unit, the geometry parameter set mesh data unit, or the attribute parameter set mesh data unit signal parameters for:
   slices belonging to a sub-mesh group; or
   slices belonging to a sub-mesh.
10. A method, comprising:
   receiving three-dimensional (3D) visual volumetric content to be compressed, the 3D visual volumetric content compressing a mesh and attribute information for attributes associated with portions of the mesh;
   compressing the 3D visual content using a mesh encoder; and
   organizing information for the compressed 3D visual content into a bit stream comprising:
   a plurality of mesh data units, the plurality comprising:
   a geometry component mesh data unit for a given slice of a sub-mesh of the mesh; and
   an attribute component mesh data unit for the given slice of the sub-mesh of the mesh.
11. The method of clause 10, wherein the plurality of mesh data units further comprises:
   one or mor additional attribute component mesh data units for the given slice of the sub-mesh of the mesh.
12. The method of clause 10, wherein the plurality of mesh data units further comprises:
   a geometry refinement component for the given slice of the sub-mesh of the mesh; or
   an attribute refinement component for the given slice of the sub-mesh of the mesh.
13. The method of clause 10, wherein the plurality of mesh data units further comprises:
   a geometry component mesh data unit for another given slice of a sub-mesh of the mesh; and an attribute component mesh data unit for the other given slice of the sub-mesh of the mesh.

14. The method of clause 10, wherein the plurality of mesh data units further comprises:
a sequence parameter set mesh data unit defining parameters to be used to decode mesh data units slices belonging to the sub-mesh of the mesh.

15. The method of clause 10, wherein the plurality of mesh data units further comprises:
geometry component and attribute component mesh data units for a plurality of slices, wherein for a plurality of sub-meshes one or more of the slices belong to the respective sub-mesh.

16. The method of clause 10, wherein a plurality of sub-meshes belong to a sub-mesh group.

17. The method of clause 10, wherein the plurality of mesh data units further comprises two or more of:
a sequence parameter set mesh data unit;
a geometry parameter set mesh data unit; or
an attribute parameter set mesh data unit.

18. The method of clause 10, wherein the sequence parameter set mesh data unit, the geometry parameter set mesh data unit, or the attribute parameter set mesh data unit signal parameters for:
slices belonging to a sub-mesh group; or
slices belonging to a sub-mesh.

19. One or more non-transitory, computer-readable media, storing program instructions that, when executed using one or more computing devices, cause the one or more computing devices to:
receive a bitstream comprising information for compressed 3D visual content, the bit stream comprising:
a plurality of mesh data units, the plurality comprising:
a geometry component mesh data unit for a given slice of a sub-mesh of the mesh; and
an attribute component mesh data unit for the given slice of the sub-mesh of the mesh; and
decompress the 3D visual content using the information included in the bitstream and organized into the geometry component mesh data unit and the attribute component mesh data unit.

20. The one or more non-transitory, computer-readable media of clause 19, wherein the plurality of mesh data units further comprises:
a geometry refinement component for the given slice of the sub-mesh of the mesh; or
an attribute refinement component for the given slice of the sub-mesh of the mesh.

Example Computer System

Figure 24:
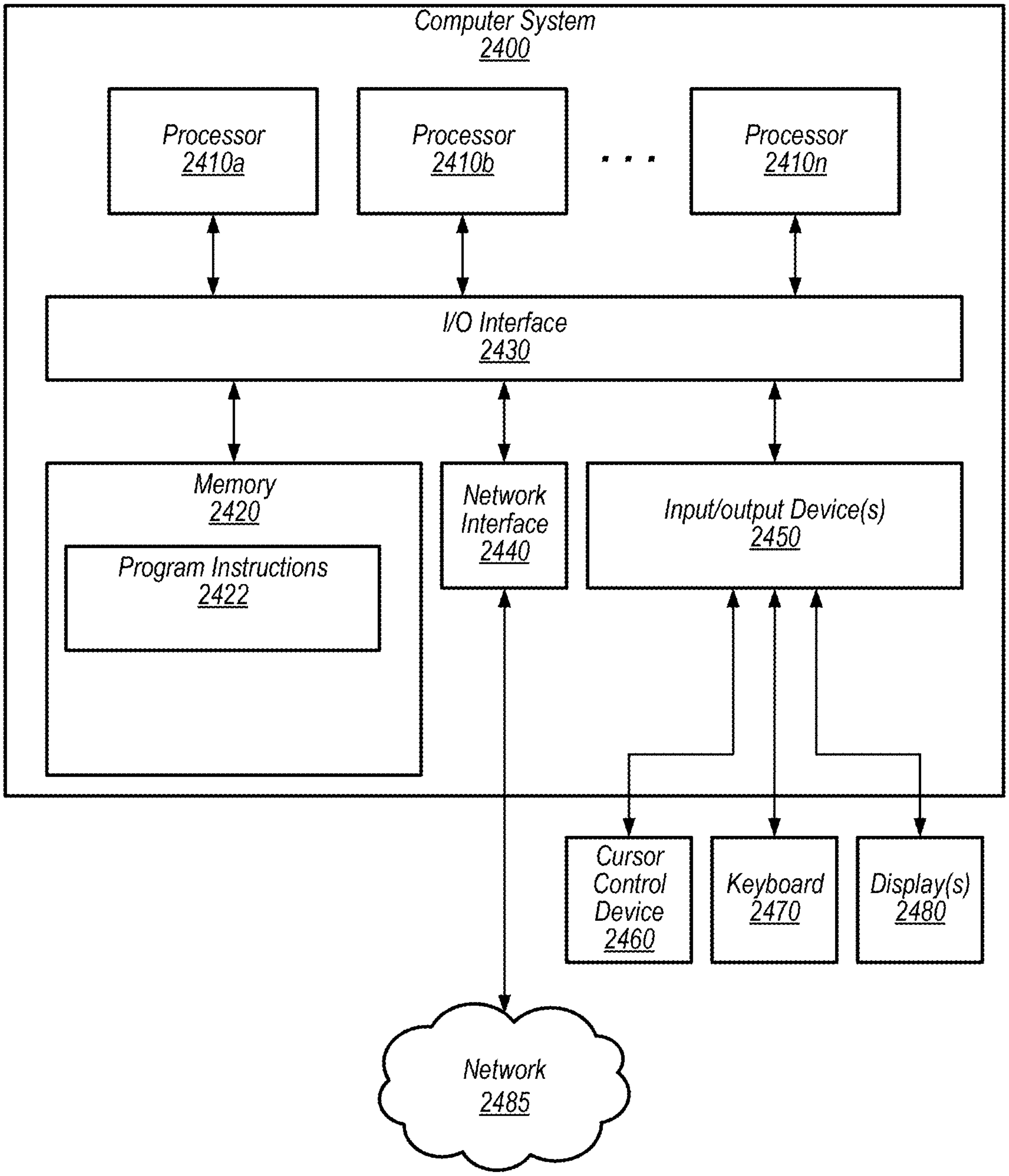
FIG. 24 illustrates an example computer system that may implement an encoder or decoder, according to some embodiments.

FIG. 24 illustrates an example computer system 2400 that may implement an encoder or decoder or any other ones of the components described herein, (e.g., any of the components described above with reference to FIGS. 1-23), in accordance with some embodiments. The computer system 2400 may be configured to execute any or all of the embodiments described above. In different embodiments, computer system 2400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 2400, which may interact with various other devices. Note that any component, action, or functionality described above with respect to FIGS. 1-23 may be implemented on one or more computers configured as computer system 2400 of FIG. 24, according to various embodiments. In the illustrated embodiment, computer system 2400 includes one or more processors 2410 coupled to a system memory 2420 via an input/output (I/O) interface 2430. Computer system 2400 further includes a network interface 2440 coupled to I/O interface 2430, and one or more input/output devices 2450, such as cursor control device 2460, keyboard 2470, and display(s) 2480. In some cases, it is contemplated that embodiments may be implemented using a single instance of computer system 2400, while in other embodiments multiple such systems, or multiple nodes making up computer system 2400, may be configured to host different portions or instances of embodiments. For example, in one embodiment some elements may be implemented via one or more nodes of computer system 2400 that are distinct from those nodes implementing other elements.

In various embodiments, computer system 2400 may be a uniprocessor system including one processor 2410, or a multiprocessor system including several processors 2410 (e.g., two, four, eight, or another suitable number). Processors 2410 may be any suitable processor capable of executing instructions. For example, in various embodiments processors 2410 may be general-purpose or embedded processors implementing any of a variety of instruction set architectures (ISAs), such as the x86, PowerPC, SPARC, or MIPS ISAs, or any other suitable ISA. In multiprocessor systems, each of processors 2410 may commonly, but not necessarily, implement the same ISA.

System memory 2420 may be configured to store point cloud compression or point cloud decompression program instructions 2422 and/or sensor data accessible by processor 2410. In various embodiments, system memory 2420 may be implemented using any suitable memory technology, such as static random-access memory (SRAM), synchronous dynamic RAM (SDRAM), nonvolatile/Flash-type memory, or any other type of memory. In the illustrated embodiment, program instructions 2422 may be configured to implement an image sensor control application incorporating any of the functionality described above. In some embodiments, program instructions and/or data may be received, sent or stored upon different types of computer-accessible media or on similar media separate from system memory 2420 or computer system 2400. While computer system 2400 is described as implementing the functionality of functional blocks of previous Figures, any of the functionality described herein may be implemented via such a computer system.

In one embodiment, I/O interface 2430 may be configured to coordinate I/O traffic between processor 2410, system memory 2420, and any peripheral devices in the device, including network interface 2440 or other peripheral interfaces, such as input/output devices 2450. In some embodiments, I/O interface 2430 may perform any necessary protocol, timing or other data transformations to convert data signals from one component (e.g., system memory 2420) into a format suitable for use by another component (e.g., processor 2410). In some embodiments, I/O interface 2430 may include support for devices attached through various types of peripheral buses, such as a variant of the Peripheral Component Interconnect (PCI) bus standard or the Universal Serial Bus (USB) standard, for example. In some embodiments, the function of I/O interface 2430 may be split into two or more separate components, such as a north bridge and a south bridge, for example. Also, in some embodiments some or all of the functionality of I/O interface 2430, such as an interface to system memory 2420, may be incorporated directly into processor 2410.

Network interface 2440 may be configured to allow data to be exchanged between computer system 2400 and other devices attached to a network 2485 (e.g., carrier or agent devices) or between nodes of computer system 2400. Network 2485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2450 may, in some embodiments, include one or more display terminals, keyboards, keypads, touchpads, scanning devices, voice or optical recognition devices, or any other devices suitable for entering or accessing data by one or more computer systems 2400. Multiple input/output devices 2450 may be present in computer system 2400 or may be distributed on various nodes of computer system 2400. In some embodiments, similar input/output devices may be separate from computer system 2400 and may interact with one or more nodes of computer system 2400 through a wired or wireless connection, such as over network interface 2440.

As shown in FIG. 24, memory 2420 may include program instructions 2422, which may be processor-executable to implement any element or action described above. In one embodiment, the program instructions may implement the methods described above. In other embodiments, different elements and data may be included. Note that data may include any data or information described above.

Those skilled in the art will appreciate that computer system 2400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2400 may be transmitted to computer system 2400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

What is claimed is:

1. One or more non-transitory, computer-readable storage media, storing program instructions that when executed using one or more computing devices, cause the one or more computing devices to:

access a first and a second instance of three-dimensional (3D) visual volumetric content, wherein the second instance of 3D visual volumetric content is derived from the first instance of 3D visual volumetric content; and generate a modified attribute map for the second instance of 3D visual volumetric content, wherein to generate the modified attribute map, the program instructions cause the one or more computing devices to:

sample the first instance of 3D visual volumetric content to generate a first point cloud with points having spatial locations in 3D space and texture coordinates that map to associated attribute values of an attribute map for the first instance of 3D visual volumetric content;

sample the second instance of 3D visual volumetric content to generate a second point cloud with points having spatial locations in 3D space and texture coordinates that map to pixel locations of the modified attribute map for the second instance of 3D visual volumetric content;

for respective ones of the points of the first point cloud:

identify a set of neighboring points of the second point cloud that neighbor a respective point of the first point cloud projected into the second point cloud; and calculate attribute values and weights for pixels of the modified attribute map that are configured to store attribute information for the set of neighboring points; and iteratively update the attribute values for the pixels of the modified attribute map based on the attribute values and weights calculated when evaluating the respective points of the first point cloud projected into the second point cloud.

2. The one or more non-transitory, computer-readable storage media of claim 1, wherein to generate the modified attribute map for the second instance of 3D visual volumetric content the program instructions further cause the one or more computing devices to:

for respective ones of the points of the second point cloud:

identify a set of neighboring points of the first point cloud that neighbor a respective point of the second point cloud projected into the first point cloud; and calculate attribute values and weights for pixels of the modified attribute map that are configured to store attribute information for the set of neighboring points, wherein said iteratively updating the attribute values for the pixels of the modified attribute map is based on the attribute values and weights calculated when evaluating the respective points of the second point cloud projected into the first point cloud.

3. The one or more non-transitory, computer-readable storage media of claim 1, wherein to calculate the attribute values and the weights for pixels of the modified attribute map that are configured to store attribute information for the set of neighboring points that neighbor the respective point of the first point cloud projected into the second point cloud, the program instructions further cause the one or more computing devices to:

determine texture coordinates that map the set of neighboring points in 3D space to pixels of the modified attribute map that store attribute information corresponding to the texture coordinates.

4. The one or more non-transitory, computer-readable storage media of claim 1, wherein the set of neighboring points that neighbor the respective point of the first point cloud projected into the second point cloud comprises four closest points having texture coordinates that correspond to pixels of the modified attribute map.

5. The one or more non-transitory, computer-readable storage media of claim 4, wherein to calculate the attribute values and the weights for pixels of the modified attribute map the program instructions cause the one or more computing device to perform an area-based interpolation using:

the associated attribute values of the respective point of the first point cloud projected into the second point cloud and respective distances in two dimensions between the respective point of the first point cloud projected into the second point cloud and the set of neighboring points in the second point cloud.

6. The one or more non-transitory, computer-readable storage media of claim 4, wherein to calculate the attribute values and the weights for pixels of the modified attribute map the program instructions cause the one or more computing device to perform an optimization problem using:

the associated attribute values of the respective point of the first point cloud projected into the second point cloud and respective distances between the respective point of the first point cloud projected into the second point cloud and the set of neighboring points in the second point cloud.

7. The one or more non-transitory, computer-readable storage media of claim 1, wherein to sample the first and second instances of 3D visual volumetric content to generate the first and second point clouds, the program instructions cause the one or more computing devices to:

adjust a number of samples taken per polygon of the geometrical mesh based on an area of the polygon.

8. The one or more non-transitory, computer-readable storage media of claim 1, wherein the program instructions, when executing using the one or more computing devices, further cause the one or more computing devices to:

for respective pixels or blocks of pixels included in the modified attribute map:

evaluate, a cost function that accounts for encoding costs of encoding pad pixel values for a pad space to select a smoothing method to be used to smooth pixel values for the respective pixels or blocks of pixels, wherein at least two or more smoothing methods are evaluated; and perform a smoothing operation on pixels of the pad space such that pixel values for respective ones of the pixels included in the pad space are smoothed based on respective pixel values of a set of neighboring pixels in a neighborhood of a given padded pixel being smoothed according to a selected smoothing method for the pixels or blocks of pixels.

9. A method, comprising:

accessing a first and a second instance of three-dimensional (3D) visual volumetric content, wherein the second instance of 3D visual volumetric content is derived from the first instance of 3D visual volumetric content; and generating a modified attribute map for the second instance of 3D visual volumetric content, wherein said generating the modified attribute map comprises:

sampling the first instance of 3D visual volumetric content to generate a first point cloud with points having spatial locations in 3D space and texture coordinates that map to associated attribute values of an attribute map for the first instance of 3D visual volumetric content;

sampling the second instance of 3D visual volumetric content to generate a second point cloud with points having spatial locations in 3D space and texture coordinates that map to pixel locations of the modified attribute map for the second instance of 3D visual volumetric content;

for respective ones of the points of the first point cloud:

identifying a set of neighboring points of the second point cloud that neighbor a respective point of the first point cloud projected into the second point cloud; and calculating attribute values and weights for pixels of the modified attribute map that are configured to store attribute information for the set of neighboring points; and iteratively updating the attribute values for the pixels of the modified attribute map based on the attribute values and weights calculated when evaluating the respective points of the first point cloud projected into the second point cloud.

10. The method of claim 9, further comprising:

performing one or more pre-processing operations on the first instance of the 3D visual volumetric content to generate the second instance of the 3D visual volumetric content.

11. The method of claim 9, further comprising:

compressing the first instance of the 3D visual volumetric content; and generating the second instance of the 3D visual volumetric content by reconstructing a compressed version of the first instance of the 3D visual volumetric content.

12. The method of claim 9, wherein said generating the modified attribute map for the second instance of 3D visual volumetric content the further comprises:

for respective ones of the points of the second point cloud:

identifying a set of neighboring points of the first point cloud that neighbor a respective point of the second point cloud projected into the first point cloud; and calculating attribute values and weights for pixels of the modified attribute map that are configured to store attribute information for the set of neighboring points, wherein said iteratively updating the attribute values for the pixels of the modified attribute map is based on the attribute values and weights calculated when evaluating the respective points of the second point cloud projected into the first point cloud.

13. The method of claim 9, wherein said calculating the attribute values and the weights for pixels of the modified attribute map that are configured to store attribute information for the set of neighboring points that neighbor the respective point of the first point cloud projected into the second point cloud comprises:

determining texture coordinates that map the set of neighboring points in 3D space to pixels of the modified attribute map that store attribute information corresponding to the texture coordinates.

14. The method of claim 9, wherein the set of neighboring points that neighbor the respective point of the first point cloud projected into the second point cloud comprises four closest points having texture coordinates that correspond to pixels of the modified attribute map.

15. The method of claim 9, wherein said calculating the attribute values and the weights for pixels of the modified attribute map the program instructions comprises performing an area-based interpolation.

16. The method of claim 15, wherein said calculating the attribute values and the weights for pixels of the modified attribute map comprises solving an optimization problem.

17. A device, comprising:

a memory storing program instructions; and one or more processors, wherein the program instructions, when executed using the one or more processors, cause the one or more processors to:

access a first and a second instance of three-dimensional (3D) visual volumetric content, wherein the second instance of 3D visual volumetric content is derived from the first instance of 3D visual volumetric content; and generate a modified attribute map for the second instance of 3D visual volumetric content, wherein said generating the modified attribute map comprises:

sampling the first instance of 3D visual volumetric content to generate a first point cloud with points having spatial locations in 3D space and texture coordinates that map to associated attribute values of an attribute map for the first instance of 3D visual volumetric content;

sampling the second instance of 3D visual volumetric content to generate a second point cloud with points having spatial locations in 3D space and texture coordinates that map to pixel locations of the modified attribute map for the second instance of 3D visual volumetric content;

for respective ones of the points of the first point cloud:

identifying a set of neighboring points of the second point cloud that neighbor a respective point of the first point cloud projected into the second point cloud; and calculating attribute values and weights for pixels of the modified attribute map that are configured to store attribute information for the set of neighboring points; and iteratively updating the attribute values for the pixels of the modified attribute map based on the attribute values and weights calculated when evaluating the respective points of the first point cloud projected into the second point cloud.

18. The device of claim 17, wherein to generate the modified attribute map for the second instance of 3D visual volumetric content the program instructions further cause the one or more processors to:

for respective ones of the points of the second point cloud:

identify a set of neighboring points of the first point cloud that neighbor a respective point of the second point cloud projected into the first point cloud; and calculate attribute values and weights for pixels of the modified attribute map that are configured to store attribute information for the set of neighboring points, wherein said iteratively updating the attribute values for the pixels of the modified attribute map is based on the attribute values and weights calculated when evaluating the respective points of the second point cloud projected into the first point cloud.

19. The device of claim 17, wherein to calculate the attribute values and the weights for pixels of the modified attribute map that are configured to store attribute information for the set of neighboring points that neighbor the respective point of the first point cloud projected into the second point cloud, the program instructions further cause the one or more processors to:

determine texture coordinates that map the set of neighboring points in 3D space to pixels of the modified attribute map that store attribute information corresponding to the texture coordinates.

20. The device of claim 17, wherein the set of neighboring points that neighbor the respective point of the first point cloud projected into the second point cloud comprises four closest points having texture coordinates that correspond to pixels of the modified attribute map.

* * * * *